(12) United States Patent
Chang et al.

(10) Patent No.: US 7,693,112 B2
(45) Date of Patent: Apr. 6, 2010

(54) APPARATUS AND METHOD FOR CONTROLLING PACKET DATA TO PROVIDE MULTIMEDIA BROADCAST/MULTICAST SERVICES IN A CDMA MOBILE COMMUNICATION SYSTEM

(75) Inventors: Jin-Weon Chang, Yongin-shi (KR);
Kook-Heui Lee, Songnam-shi (KR);
Sung-Hoon Kim, Seoul (KR);
Joon-Goo Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1726 days.

(21) Appl. No.: 10/387,029

(22) Filed: Mar. 12, 2003

(65) Prior Publication Data

US 2003/0174678 A1    Sep. 18, 2003

(30) Foreign Application Priority Data

Mar. 15, 2002    (KR) .................... 10-2002-0014222

(51) Int. Cl.
*H04B 7/216* (2006.01)
(52) U.S. Cl. .................... 370/335; 370/338; 370/465; 725/62; 455/560; 455/561
(58) Field of Classification Search ................ 370/335, 370/441, 465, 486–490, 338, 401, 474; 725/62, 725/98, 73–77, 118, 105; 455/561, 436, 455/450
See application file for complete search history.

(56) References Cited

U.S. PATENT DOCUMENTS 6,091,717 A * 7/2000 Honkasalo et al. .......... 370/329

(Continued)

FOREIGN PATENT DOCUMENTS

EP    0 664 658 A2    7/1995

(Continued)

OTHER PUBLICATIONS

French Office Action dated Sep. 23, 2003 issued in a counterpart application, namely, Appln. No. 0303183000.

(Continued)

*Primary Examiner*—Charles N Appiah
*Assistant Examiner*—Khawar Iqbal
(74) *Attorney, Agent, or Firm*—The Farrell Law Firm, LLP

(57) ABSTRACT

An apparatus and method for providing multimedia broadcast and multicast services in a CDMA (Code Division Multiple Access) mobile communication system. The apparatus and method enable a common MBMC (Multimedia Broadcast/Multicast Control) layer to be allocated between a plurality of cells, enable MBMC layers to be classified on the basis of types of services, and use the classified MBMC layers. That is, individual MBMC layers do not have to store large-capacity data because a unique service or transmission rate in each of cells is based on a slow rate, and the individual MBMC layers corresponding to respective cells process a service requiring complex scheduling. Moreover, the apparatus and method enable the same information to be provided to a plurality of cells and enable a streaming-type service to be processed in a common MBMC layer commonly used in the cells. The apparatus and method can not only reduce an overhead of storage and processing devices but also minimize a time difference between broadcast and multicast timings of different cells, by enabling the common MBMC layer to commonly process MBMS information for the plurality of cells.

14 Claims, 17 Drawing Sheets

U.S. PATENT DOCUMENTS

| | | | |
|---|---|---|---|
| 6,169,894 B1 | 1/2001 | McCormick et al. | |
| 6,181,683 B1 | 1/2001 | Chevillat et al. | |
| 6,510,145 B1 | 1/2003 | Kim et al. | |
| 6,556,835 B1* | 4/2003 | Raivisto | 455/466 |
| 6,738,368 B1* | 5/2004 | Terry | 370/342 |
| 6,928,304 B2* | 8/2005 | Wigell et al. | 455/561 |
| 7,020,151 B2* | 3/2006 | Terry | 370/414 |
| 2002/0085531 A1* | 7/2002 | Herrmann et al. | 370/338 |
| 2002/0089952 A1* | 7/2002 | Cao et al. | 370/335 |
| 2002/0097740 A1* | 7/2002 | Choi et al. | 370/441 |
| 2002/0114280 A1* | 8/2002 | Yi et al. | 370/235 |
| 2002/0150058 A1* | 10/2002 | Kim et al. | 370/280 |
| 2002/0191567 A1* | 12/2002 | Famolari et al. | 370/335 |
| 2002/0196741 A1* | 12/2002 | Jaramillo et al. | 370/252 |
| 2003/0093530 A1* | 5/2003 | Syed | 709/226 |
| 2003/0134622 A1* | 7/2003 | Hsu et al. | 455/414 |
| 2003/0134653 A1* | 7/2003 | Sarkkinen et al. | 455/517 |
| 2003/0157949 A1* | 8/2003 | Sarkkinen et al. | 455/503 |
| 2004/0067756 A1* | 4/2004 | Wager et al. | 455/450 |
| 2004/0081192 A1* | 4/2004 | Koulakiotis et al. | 370/432 |
| 2004/0146033 A1* | 7/2004 | Soderstrom et al. | 370/338 |

FOREIGN PATENT DOCUMENTS

| | | |
|---|---|---|
| EP | 0 877 512 A2 | 11/1998 |
| EP | 1 209 936 A1 | 5/2002 |
| JP | 2002-051006 | 2/2002 |
| KR | 1020000037821 | 7/2000 |
| KR | 1020010023829 | 3/2001 |
| KR | 1020020034977 | 5/2002 |

OTHER PUBLICATIONS

"3$^{rd}$ Generation Partnership Project; Technical Specification Group Services and System Aspects; Multimedia Broadcast/Multicast Service; Stage 1 (Release 5)", Dec. 2001, pp. 1-13.

"Digital Cellular Telecommunications System (Phase 2+) (GSM); Universal Mobile Telecommunication System (UMTS); Technical Realization of Cell Broadcast Service (CBS) (3GPP TS 23.041 version 4.2.0 Release 4)", Dec. 2001, pp. 1-37.

"Universal Mobile Telecommunications Systems (UMTS); Broadcast/Multicast Control BMC (3GPP TS 25.324 version 4.0.0. Release 4)", Mar. 2001, pp. 1-24.

3$^{rd}$ Generation Partnership Project; Technical Specification Group Services and System Aspects; Multimedia Broadcast/Multicast Service; Architecture and Functional Description (Release 5), 3GPP TR 23.846, Jan. 2002.

Combined Search and Examination Report dated Aug. 14, 2003, issued in a counterpart application, namely, Appln. No. GB 0305538. 1.

* cited by examiner

APPARATUS AND METHOD FOR CONTROLLING PACKET DATA TO PROVIDE MULTIMEDIA BROADCAST/MULTICAST SERVICES IN A CDMA MOBILE COMMUNICATION SYSTEM

PRIORITY

This application claims priority to an application entitled "APPARATUS AND METHOD FOR CONTROLLING PACKET DATA TO PROVIDE MULTIMEDIA BROADCAST/MULTICAST SERVICES IN CDMA MOBILE COMMUNICATION SYSTEM", filed in the Korean Industrial Property Office on Mar. 15, 2002 and assigned Serial No. 2002-14222, the contents of which are hereby incorporated by reference.

BACKGROUND OF THE INVENTION

1. Field of the Invention

The present invention relates generally to an apparatus and method for transmitting packet data in a CDMA (Code Division Multiple Access) mobile communication system, and more particularly an apparatus and method for providing multimedia broadcast/multicast services.

2. Description of the Related Art

With the development of the communication industry, services provided by a CDMA (Code Division Multiple Access) mobile communication system has developed multimedia multicasting communication services capable of transmitting large-capacity data, such as packet data and circuit data, as well as voice services. A broadcast/multicast service capable of providing data from one data source to a plurality of pieces of UE (User Equipment) to support multimedia multicasting communication has also been suggested. The broadcast/multicast service is divided into a CBS (Cell Broadcast Service) mainly based on messages, and an MBMS (Multimedia Broadcast/Multicast Service) for supporting various types of multimedia, e.g., real-time video and voice, still images, characters, etc.

The CBS is used to broadcast a plurality of messages to all pieces of UE located in a specific service area. At this time, the specific service area in which the CBS is provided can be one small cell or an entire service area in which a mobile communication service is provided. A service area can also be set by each broadcast message.

FIG. 1 illustrates a CDMA (Code Division Multiple Access) mobile communication system for providing a conventional CBS. Referring to FIG. 1, CBEs (Cell Broadcast Entities) 101, the sources of all cell broadcast messages, are devices for providing specific messages, e.g., weather information on a regional basis. The CBEs 101 can exist as a plurality of devices based on types of services provided in a mobile communication network. CBE messages from the CBEs 101 are transferred to a CBC (Cell Broadcast Center) 103 through a predetermined interface 102. The interface 102 between the CBEs 101 and the CBC 103 can vary with a mobile communication carrier or CBS provider. Further, the interface 102 is not limited to a certain specification. The CBC 103 manages the CBE messages provided from the CBEs 101 on the basis of a predetermined system, and a CBS message corresponding to a CBE message is transferred to an RNC (Radio Network Controller) 105.

More specifically, the CBC 103 selects cells to which the CBS message is transferred, creates a CBS message based on the CBE message, and transmits the created CBS message to the RNC 105. The RNC 105 decides, for example, a point of time for broadcast, and the number of an iterative transmission for the CBS message, at the time of broadcasting the CBS message. That is, the CBC 103 executes an overall control operation for the CBS. The CBS message created by the CBC 103 is transferred to the RNC 105 through a predetermined interface $Iu_{BC}$ 104. The CBS message transferred to the RNC 105 is stored in the RNC 105. The RNC 105 sets up an Iub interface 106 between itself and Node-Bs 107, and a Uu interface 108 between pieces of UE (User Equipment) 109 and the Node-Bs 107.

To set up the interfaces, the RNC 105 considers a size of the CBS message and a radio channel condition on a cell basis. Setup information is transferred to the UE 109 through radio bearers. The RNC 105 carries out a CBS message storage function, a radio bearer setup function, a CBS message scheduling function, reporting to the CBC 103, state information indicating whether the transmission has succeeded or failed, etc. The UE 109 receives the CBS message, processes an error of the CBS message, and transfers the received CBS message to a higher layer, etc.

FIG. 2 is a flow chart illustrating signal processing based on a "Write-Replace" procedure as one of elementary procedures of the $Iu_{BC}$ interface 104 between the CBC 103 and the RNC 105 when the CBS is provided.

Referring to FIG. 2, the elementary procedures of the $Iu_{BC}$ interface 104 consist of five procedures including: a "Write-Replace" procedure for transferring a CBS message, a "Kill" procedure for stopping the CBS message, a "Load Status Enquire" procedure for enquiring the amount of load of the CBS message, and a "Reset" procedure for terminating the broadcast in one or more service areas. At step 203, the "Write-Replace" procedure is used when the CBC 103 transfers a new CBS message to the RNC 105 or changes a previously transmitted CBS message. In the "Write-Replace" procedure, the CBC 103 transfers a WRITE-REPLACE message carrying the broadcast information to the RNC 105. The RNC 105 stores the content of the received WRITE-REPLACE message and performs the predetermined processing. At step 204, the RNC 105 terminates the "Write-Replace" procedure by transmitting a response message based on a result of the performed processing. The response message includes a "WRITE-REPLACE COMPLETE" message indicating the successful outcome of the procedure and a "WRITE-REPLACE FAILURE" message indicating the unsuccessful outcome of the procedure.

Also, the WRITE-REPLACE message commonly includes information relating to a message type, a message ID (Identifier), a new serial number, an old serial number, a service areas list, a category, the number of broadcasts, a repetition period, a data coding scheme and broadcast content, etc. The message type indicates a message type based on each procedure, and the message ID identifies the message. The message serial number indicates a sequence number of the CBS message content. The entire message content is actually divided into a plurality of messages and then transmitted in the form of the messages. The new serial number is information indicating the new CBS message content. The previous serial number is used in when the CBS message is changed. The service areas list is information indicating at least one service area in which the CBS message is broadcast. The category is for identifying a priority of the CBS message content. The number of broadcasts and the repetition period is information indicating the number of broadcasts of the CBS message content and the repetition period of the CBS message content. The data coding scheme indicates a coding scheme on a language basis, and the actual CBS message content is contained in the broadcast content.

Using the elementary procedures, the CBC 103 can transfer the CBS message to the RNC 105 and control the broadcast for the UE 109.

FIG. 3 illustrates communication protocol architecture of a UTRAN (UMTS (Universal Mobile Telecommunications System) Terrestrial Radio Access Network) including the RNC 105 and the Node-Bs 107 illustrated in FIG. 1. Referring to FIG. 3, CBS information 301 in a U (User)-plane from the CBC 103 is transferred to a BMC-SAP (Broadcast/Multicast Control-Service Access Point) 302 via the $Iu_{BC}$-interface 104. The BMC-SAP 302 transfers the CBS information 301 to a BMC layer 303 associated with a corresponding cell on the basis of a service area. Each of BMC layers 303 exists corresponding to one cell and broadcasts the CBS message to the corresponding cell. The CBS information 301 transferred from the CBC 103 is stored in the BMC layer 303 of the corresponding cell. The BMC layer 303 considers a length of the CBS message, the number of an iterative transmission, a repetition period, etc., and then requests an RRC (Radio Resource Control) layer 304 to set up or change radio channels through a C-SAP (Control-Service Access Point) 305. The RRC layer 304 controls radio resources of the RNC. In response to the radio channel setup or change request, the RRC layer 304 determines whether corresponding radio channels can be set up or changed. If the setup or change of the radio channels for broadcasting the CBS message cannot be achieved because of insufficient radio resources, the RRC layer 304 notifies the BMC layer 303 that the channel setup or change has failed. If the BMC layer 303 receives the notification of the channel setup or change failure from the RRC layer 304, it transmits the notification to the CBC 103. In response to the notification, the CBC 103 can adjust the length of the CBS message.

When the channel setup or change can be achieved, the RRC layer 304 configures an RLC (Radio Link Control) layer 307, an MAC-c/sh (Medium Access Control-common/shared) layer 309, and a Cell_PHY (Cell_PHYsical) layer 312 being a physical layer of a corresponding cell. Further, the CBS message is stored in the BMC layer 303 and then transmitted to the RLC layer 307 in a UM (Unacknowledged Mode) after considering the number of an iterative transmission, the repetition period, etc. and scheduling the CBS message. The RLC layer 307 operates in three modes including a TM (Transparent Mode), the UM, and an AM (Acknowledged Mode). The TM enables the RLC layer 307 to transparently transmit a data block from a higher layer to a lower layer without a header. The UM segments a data block received from a higher layer into RLC protocol data units having a predetermined size and then transmits header information such as a sequence number along with the RLC protocol data units. The AM segments a data block received from a higher layer into RLC protocol data units and adds header information to the RLC protocol data units. Moreover, the AM retransmits data in order to ensure error-free transmission. Since the same information is transmitted to a plurality of users in the broadcasting of the CBS message, the RLC layer 307 uses the UM because information retransmission is not possible.

The CBS message processed by the RLC layer 307 on the basis of RLC protocol data units having a predetermined size is transferred to the MAC-c/sh layer 309 through a CTCH (Common Traffic CHannel) 308 being a logical channel. The MAC-c/sh layer 309 transfers the received CTCH message to a Cell_PHY layer 312 of a corresponding cell. The MAC layer includes the MAC-c/sh layer 309 for a common channel and a MAC-d (Medium Access Control-dedicated) layer 310 for a dedicated channel on a UE basis. However, in the case of the CBS, broadcasting is achieved through an FACH (Forward Access CHannel) 311 being a common transport channel. Thus, the MAC-c/sh layer 309 transfers the CTCH message based on the CBS to the Cell_PHY layer 312 of the corresponding cell. The RRC, BMC, and RLC layers 304, 303, and 307, and the MAC layer are located within the RNC 105.

Also, the Cell_PHY layer 312 corresponding to each cell is located in the Node-B 107 and physically isolated from other layers. Thus, as an interface for safely transferring data is needed, the MAC-c/sh layer 309 uses the Iub interface 106 to transfer data to the Cell_PHY layer 312. The Cell_PHY layer 312 corresponding to each cell performs channel coding, rate matching, interleaving, modulation, etc. for the CBS message distributed by the MAC-c/sh layer 309, maps the FACH to an S-CCPCH (Secondary-Common Control Physical CHannel) 313, which is a physical channel, and transmits the CBS message to a radio channel. Conceptually, mapping to the physical channel means that the CBS message is transmitted through a radio channel (Uu) 314.

FIG. 4 illustrates a detailed configuration and functions of the BMC layer 303 illustrated in FIG. 3. Referring to FIG. 4, a CBS message received from the CBC (Cell Broadcast Center) 103 is distributed or transferred from the BMC-SAP 302 to BMC layers 303, which correspond to all cells included in the entire service area. The BMC layers 303 transmit the CBS message to controllers 404. A controller 404 stores the received CBS message in a message storage 407. Further, if the CBC 103 considers information associated with the number of rebroadcasts, the repetition period, etc., received from the CBC 103 and then determines that the radio channels must be setup or changed, the CBC 103 requests the RRC layer 304 to perform the channel setup or change through a CBMC (Control BMC)-SAP 305. The operation of the RRC layer 304 has been described in connection with FIG. 3 above.

The CBS message stored in the message storage 407 is transferred to a scheduler 408 under the control of the controller 404. The scheduler 408 schedules the CBS message transferred from the message storage 407 and then transfers it to a transmission buffer 409. The CBS message transferred to the transmission buffer 409 is transferred to the RLC layer 307 through the UM 410. The RLC layer 307 corresponds to the same cell as the BMC layer 303.

FIG. 5 illustrates communication protocol architecture of a UE (User Equipment) for providing the conventional CBS corresponding to the configuration illustrated in FIG. 3. Referring to FIG. 5, the CBS message transmitted from the Node-B 107 through a radio channel is transmitted to a UE_PHY layer 503 of the UE 109 through an S-CCPCH 502 coupled to the Uu interface 314, which is a radio channel interface. The UE_PHY layer 503 carries out demodulation, deinterleaving, channel decoding, etc., for the received CBS message and then the CBS message is recovered to data on an FACH 504 being a transmission channel. The recovered data is transferred to a MAC-c/sh layer 505. A MAC-d layer 506, which is responsible for a dedicated channel, also exists in the UE side. However, the CBS message is not transferred to the MAC-d layer 506. The MAC-c/sh layer 505 transfers data corresponding to the CBS message to an RLC layer 508 responsible for a CTCH 507 being a corresponding logical channel. The RLC layer 508 associates CBS message segments having a predetermined size from the RLC layer of the RNC 105 to generate an original message and then transfers the associated CBS message segments to a BMC layer 509. The BMC layer 509 determines whether the CBS message from the RLC layer 508 is a new message or a repeated CBS message. If the CBS message is a new message, it is transferred to a higher layer through a BMC-SAP 510 as indicated by a reference numeral 511. An RRC layer 512 in the UE side controls the BMC layer 509 through a C-SAP 513, and controls the RLC layer 508, the MAC-c/sh layer 505 and the UE_PHY layer 503 through a corresponding C-SAP 514.

The above-described CBS provides information in the form of a CBS message to a user, but it does not provide the user with information in the form of various multimedia, such as a moving picture, a still image, voice and characters. Thus, an MBMS (Multimedia Broadcast/Multicast Service) is needed to provide a plurality of users with the information in the form of various multimedia. The operation of the MBMS is similar to that of the above-described CBS. However, the MBMS independent of the CBS provides information in the form of multimedia having high-speed data.

FIG. 6 illustrates a CDMA mobile communication system for providing a conventional MBMS. The MBMS must provide various multimedia contents. Thus, the system for providing the MBMS must accommodate a plurality of different content providers.

Referring to FIG. 6, each content provider 601 transfers data of multimedia contents to a BM-SC (Broadcast/Multi-cast-Service Center) 602. A predetermined interface 603 is coupled between the content providers 601 and the BM-SC 602. The interface 603 may vary with a communication network carrier or MBMS provider, and is not limited to a certain specification.

The BM-SC 602 schedules multimedia contents provided from the plurality of content providers 601 on a channel basis and then transfers the scheduled multimedia contents to a GGSN (Gateway GPRS Support Node) 605. Further, the BM-SC 602 provides an interface coupled to the content providers 601 and also carries out charging and authentication procedures for the content providers 601.

Alternatively, the data of the multimedia contents is not transferred to the BM-SC 602 and can be provided from a BMS (Broadcast/Multicast Source), which is a source providing entity directly coupled to the GGSN 605. Where the BMS 604 is allowed, an interface between the GGSN 605 and the BM-SC 602 or the BMS 604 can use an IP (Internet Protocol) 606. Alternatively, if the BMS 604 is not allowed, the BM-SC 602 manages all sources for the MBMS. Moreover, the BM-SC 602 uses a GTP (Generic Tunneling Protocol) 608 between the GGSN 605 and an SGSN (Serving GPRS Support Node) 607 to directly transfer the data of the MBMS contents to the SGSN 607, through the GGSN 605. The GGSN 605 copies the data of MBMS contents to transfer the copies to a plurality of SGSNs 607.

The SGSN 607 transfers the data of the MBMS contents to a corresponding RNC 609 on a service basis using the IP 610. The IP 610 supports a multicast function capable of transferring the same contents from one SGSN 607 to a plurality of RNCs 609 and also a unicast function capable of transferring the contents to one RNC 609. The RNC 609 transfers the MBMS data to a Node-B 611 through an interface 612. The Node-B 611 transfers the MBMS data to corresponding pieces of UE 613 using a Uu interface 614, which is an air interface.

FIG. 7 is a flow chart illustrating a signal processing procedure of a mobile communication network when a broadcast service of the conventional MBMS is provided. Referring to FIG. 7, a broadcast service of an MBMS is activated in response to a service delivery request from at least one service provider 601. Thus, at step 701, the BM-SC 602 receives the service delivery request from the service provider 601. At step 702, the BM-SC 602 receiving the service delivery request carries out charging and authentication procedures for the service provider 601 and then receives MBMS contents from the service provider 601. At step 703, radio access bearers for the broadcast service are configured in a CN (Core Network) to transfer the MBMS data to the RNC 609. The configuration of the radio access bearers for the broadcast service includes a procedure for setting up a multicast connection between the BM-SC 602 and the GGSN 605, a GTP connection between the GGSN 605 and the SGSN 607, and an IP multicast connection between the SGSN 607 and the RNC 609. Connection protocols between elements are based on the protocol architecture illustrated in FIG. 6. At step 704, radio bearers for the broadcast service are configured in the RNC 609. The radio bearers for the broadcast service are coupled between the RNC 609 and Node-Bs 611 to deliver the MBMS to pieces of UE 613. At the time of configuring the radio bearers, a common radio channel between the Node-B 611 and UE 613 is simultaneously set up After configuring the radio access bearers between the BM-SC 602, the GGSN 605, and the SGSN 607, in the CN and configuring the radio bearers in the RNC 609, at step 705, the MBMS data scheduled by the BM-SC 602 begins to be broadcast to the entire service area.

FIG. 8 is a flow chart illustrating a signal processing procedure of the UE when a broadcast service of the conventional MBMS is provided. Referring to FIG. 8, if the UE 613 selects a broadcast service of the MBMS at step 801, the UE 613 obtains parameters for at least one corresponding broadcast channel to receive the broadcast service in step 802. Alternatively, broadcast channel parameters received and stored in a procedure of enabling the UE 613 to recognize a cell, can be used. Also, the UE 613 can use broadcast channel parameters received from the Node-B 611 when it selects the broadcast service of the MBMS. In step 803, the broadcast channel is configured using the parameters obtained from the above-described procedure. If the broadcast channel is configured, the UE 613 receives data of the broadcast service of the MBMS through the configured broadcast channel in step 804.

FIG. 9 is a flow chart illustrating a signal processing procedure of a mobile communication network when a multicast service of the conventional MBMS is provided. Referring to FIG. 9, if the BM-SC 602 receives a multicast service delivery request from at least one service provider 601, the multicast service is activated at step 901. At step 902, the BM-SC 602 provides the multicast service to pieces of UE 613 after carrying out charging and authentication procedures for the service provider 601 requesting the multicast service delivery. At step 903, it is determined whether a service request corresponding to the multicast service delivery is received from the UE 613. The multicast service of the MBMS is different from the broadcast service in that the multicast service is provided to the UE 613 in response to the service request from the UE 613.

At step 903, if the service request is not received from the UE 613, a current state is maintained. Otherwise, if the service request is received from the UE 613, the UE 613 is authenticated in step 904. That is, it is determined whether the UE 613 has a right to receive the multicast service. The SGSN 607 carries out authentications for pieces of the UE 613. If the UE authentication has been completed, the SGSN 607 determines, at step 905, whether a connection for the multicast service of the MBMS has been set up.

If the connection for the multicast service is not set up, radio access bearers for the multicast service are configured in the CN at step 906. The configuration of the radio access bearers for the multicast service includes an IP connection between the BM-SC 602 and the GGSN 605, a GTP connection between the SGSN 607 and the GGSN 605, and an IP multicast connection between the SGSN 607 and the RNC

609. At step 907, radio bearers for an Iub interface and a Uu interface between the RNC 609 and the UE 613 for the multicast service of the MBMS are configured in the RNC 609.

If it is determined that the connection has been configured at step 905 or the radio bearers have been configured at the above steps 906 and 907, the requested multicast service is set up and then the SGSN 607 confirms the UE's service request at step 908. The SGSN 607 transfers information associated with a channel for receiving data of the multicast service of the MBMS. At step 909, the multicast service of the MBMS is provided to the pieces of the UE 613 authorized from the BM-SC 602.

FIG. 10 is a flow chart illustrating a signal processing procedure of the UE when a multicast service of the conventional MBMS is provided. Referring to FIG. 10, if the UE 613 selects the multicast service of the MBMS at step 1001, the UE 613 transfers a multicast service request to a mobile communication network at step 1002. At step 1003, the UE 613 receives confirmation information from the mobile communication network in response to the multicast service request. At this time, the UE 613 receives, from the mobile communication network, information necessary for receiving data of the multicast service. At step 1004, the UE 613 configures at least one multicast channel for receiving the multicast service of the MBMS using the received information. At step 1005, the UE 613 provides a user with the data of the multicast service of the MBMS through the configured multicast channel.

FIG. 11 illustrates communication protocol architecture of the UTRAN including the RNC 609 and the Node-Bs 611 illustrated in FIG. 6. Referring to FIG. 11, MBMS information 1101 in a U-plane from the BM-SC 602 is transferred to an MBMC-SAP (Multimedia Broadcast/Multicast Control-Service Access Point) 1102 coupled to the RNC 609 through the Iu interface 610 using IP multicast. The MBMS information 1101 is provided from the BM-SC 602. The MBMC-SAP 1102 transfers the MBMS information 1101 to an MBMC layer 1103 coupled to a corresponding cell. The MBMC layer 1103 corresponds to one cell and is responsible for the MBMS in the corresponding cell. The MBMS information 1101 received from the BM-SC 602 is stored in the MBMC layer 1103 of the corresponding cell. The MBMC layer 1103 requests an RRC layer 1104 controlling radio resources of the RNC 609 to set up or change radio channels through a CMBMC-SAP (Control MBMC-Service Access Point) 1105. To request the channel setup or change, the MBMC layer 1103 must consider a transmission rate of MBMS information to be broadcast/multicast in the corresponding cell, broadcast/multicast timing, a priority of a corresponding service, the number of rebroadcasts/remulticasts, a repetition period, etc. The RRC layer 1104 determines whether the radio channels can be set up or changed in response to the request from the MBMC layer 1103. If the radio channels can be set up or changed, the RRC layer 1104 sets up an RLC (Radio Link Control) layer 1107, a MAC-c/sh layer 1109, and a Cell_PHY (Cell_PHYsical) layer 1112, which is a physical layer of a corresponding cell through a C-SAP (Control-Service Access Point) 1106. However, if the RRC layer 1104 determines that it is difficult for the radio channels for the MBMS to be set up or changed because of insufficient radio resources, it notifies the MBMC layer 1103 of unsuccessful radio channel setup or change. The MBMC layer 1103 notifies the BM-SC 602 of the unsuccessful radio channel setup or change, thereby enabling the BM-SC 602 to stop a corresponding MBMS or adjust a transmission rate of the MBMS information. On the other hand, the MBMC layer 1103 schedules the MBMS information by considering the transmission rate, the broadcast/multicast timing, the number of rebroadcasts/remulticasts, the repetition period, etc., and then transfers the MBMS information to the RLC layer 1107 in the UM.

The MBMS information received from the MBMC layer 1103 is segmented into RLC protocol data units having a predetermined size by the RLC layer 1107. The RLC protocol data units are transferred to the MAC-c/sh layer 1109 through a CCTH 1108, which is a logical channel, by the RLC layer 1107. The MAC-c/sh layer 1109 transfers the RLC protocol data units to the Cell_PHY layer 1112 of a corresponding cell. Like the CBS, the MBMS is provided through a common channel. Thus, the RLC protocol data units for the MBMS are transferred from the MAC-c/sh layer 1109 to the Cell_PHY layer 1112 of the corresponding cell using an FACH 1111, which is a common transport channel.

The Cell_PHY layer 1112, which corresponds to each cell, performs channel coding, rate matching, interleaving, and modulation for the RLC protocol data units distributed by the MAC-c/sh layer 1109, maps the FACH to an S-CCPCH 1113 being a physical channel, and transmits the RLC protocol data units to a radio channel. Conceptually, the mapping to the physical channel means that the RLC protocol data units are transmitted through the Uu interface (radio channel) 614.

FIG. 12 illustrates communication protocol architecture of UE for providing the conventional MBMS corresponding to the configuration illustrated in FIG. 11. Referring to FIG. 12, a signal from the Node-B 611 is transmitted to a UE_PHY layer 1203 of the UE through an S-CCPCH 1202 of the Uu interface 614, which is the air interface. The UE_PHY layer 1203 performs demodulation, deinterleaving, and channel decoding for the received signal, produces data of an FACH 1204 from the received signal, and transfers the data of the FACH 1204 to a MAC-c/sh layer 1205.

As described above, the data is not transferred to a MAC-d layer 1206 responsible for a dedicated channel in the MBMS. The MAC-c/sh layer 1205 transfers RLC protocol data units for MBMS to an RLC layer 1208 responsible for a CTCH 1207 being a corresponding logical channel. The RLC layer 1208 associates the RLC protocol data units having the predetermined size received from the RLC layer of a transmitting side to generate original MBMS information and then transfers the MBMS information to an MBMC layer 1209. The MBMC layer 1209 transfers the MBMS information to a higher layer through an MBMC-SAP 1210 as indicated by a reference numeral 1211. Also, the UE 613 performs a series of control operations for the MBMS as in the RNC 609. That is, an RRC layer 1212 of the UE 613 controls the MBMC layer 1209 through the CMBMC-SAP 1213. Further, the RLC layer 1208, the MAC-c/sh layer 1205 and the UE_PHY layer 1203 are controlled through corresponding C-SAPs 1214 coupled to the RRC layer 1212.

FIG. 13 illustrates a detailed configuration and functions of the MBMC layers 1103 illustrated in FIG. 11. Referring to FIG. 13, the MBMS information transmitted from the BM-SC 602 is input into the MBMC-SAP 1102 and then distributed or transferred to MBMC layers corresponding to all cells included in the entire service area by the MBMC-SAP 1102. The MBMS information is transferred from an MBMC layer 1103 of each corresponding cell to a controller 1304. If the controller 1304 considers information associated with a transmission rate of the MBMS information, the broadcast/multicast timing, and a priority, from the BM-SC 602 and determines that radio channels must be prepared (i.e., either set up or changed), it requests the RRC layer 1104 to set up or change the radio channels through the CMBMC-SAP 1105. The operation of the RRC layer 1104 is the same as described in FIG. 11. Under the control of the controller 1304, the MBMS information stored in data storages 1307 is transferred to schedulers 1308. The schedulers 1308 schedule the MBMS information and then the scheduled MBMS information is transferred to the RLC layer 1107 based on the UM 1310 through transmission buffers 1309.

The above-described MBMC layer 1103 illustrated in FIG. 13 is different from the BMC layer 303 for the CBS illustrated in FIG. 4. That is, the BMC layer 303 allows a single CTCH in each cell and supports a simple message-type service, while the MBMC layer 1103 supports the MBMS. Thus, the MBMS needs a plurality of broadcast channels and a plurality of multicast channels on a cell basis and must support a transmission rate higher than the CBS. Moreover, the data storages 1307 must store service information on a service basis, and the data storages can store large-capacity data in comparison with the BMC layer 303. The schedulers 1308 must carry out respective service scheduling functions corresponding to the number of services supported in a corresponding cell. To transmit the service information to RLC layers 1311 on the service basis, the MBMC layer must include the transmission buffers 1309 corresponding to the number of services supported in a corresponding cell. To support a plurality of MBMSs, the controller 1304 must carry out more extended functions than the BMC layer 303.

The broadcast service of the MBMS simultaneously transmits data to a plurality of cells according to a defined service area. Thus, when the MBMC layer 1103 is constructed as illustrated in FIG. 13, there is a problem in that the MBMC layer 1103 of each cell repeatedly stores the same large-capacity data having a high-speed transmission rate. Similarly, there is a problem in that each cell repeatedly stores the same large-capacity data in the multicast service. For this reason, in the UTRAN, storage devices may be inefficiently utilized and the same broadcast/multicast between cells cannot be performed because respective cells individually perform MBMS scheduling and transmission. In particular, a real-time streaming service must simultaneously provide cells with the same high-speed service. Thus, the architecture of an independent cell may cause unnecessary repetition of operations. Since broadcast and multicast timings in respective cells are different, the continuous service cannot be ensured and a QoS (Quality of Service) can be degraded, from a user's perspective, when a handover is carried out in an overlap area between cells.

SUMMARY OF THE INVENTION

Therefore, the present invention has been designed in view of the above-described problems, and it is an object of the present invention to provide a method for transferring MBMS (Multimedia Broadcast/Multicast service) information to a lower layer in a UTRAN (UMTS (Universal Mobile Telecommunications System) Terrestrial Radio Access Network).

It is another object of the present invention to provide a method for efficiently storing data such that MBMS (Multimedia Broadcast/Multicast service) information can be transferred to a lower layer in a UTRAN (UMTS (Universal Mobile Telecommunications System) Terrestrial Radio Access Network).

It is another object of the present invention to provide a method for minimizing a time difference between broadcast/multicast timings in cells of a broadcast/multicast service area based on an MBMS (Multimedia Broadcast/Multicast service) and minimizing the degradation of the quality of service.

It is another object of the present invention to provide a method for transferring the same information through a common MBMC (Multimedia Broadcast/Multicast Control) layer shared between cells.

It is another object of the present invention to provide a method for differentiating MBMS (Multimedia Broadcast/Multicast service) information from other information and processing the differentiated MBMS information on the basis of the complexity of scheduling.

It is yet another object of the present invention to provide a method for classifying MBMS (Multimedia Broadcast/Multicast service) information on the basis of the complexity of scheduling and transferring the classified MBMS information through different MBMC (Multimedia Broadcast/Multicast Control) layers.

In accordance with one aspect of the present invention, the above and other objects can be accomplished by an apparatus for transmitting packet data to transfer a plurality of individual service data and a plurality of common service data from a service center to a plurality of cells in a CDMA (Code Division Multiple Access) mobile communication system that includes the cells representing service areas, and the service center for storing a plurality of service data having the individual service data for the cells and the common service data shared between at least two cells, the apparatus comprising: individual processors for receiving the individual service data from the service center and transferring the individual service data to a cell requesting a corresponding individual service, the number of the individual processors being equal to that of the cells; and a common processor for receiving the common service data from the service center and transferring the common service data to at least two cells.

In accordance with another aspect of the present invention, there is provided an apparatus for processing packet data to transfer MBMS (Multimedia Broadcast/Multicast Service) information from a broadcast/multicast service center to radio link controllers in a CDMA (Code Division Multiple Access) mobile communication system including Node-Bs for providing MBMS to respective cells within a service area, the radio link controllers corresponding to the Node-Bs, and a media access controller for transferring the MBMS information from the radio link controllers to corresponding Node-Bs, the apparatus comprising: a controller for performing an overall control operation to transfer the MBMS information from the broadcast/multicast service center to the radio link controllers; a data storage for storing the MBMS information from the broadcast/multicast service center under the control of the controller; a scheduler for scheduling the MBMS information from the data storage under the control of the controller; and a transmission buffer for temporarily storing the scheduled MBMS information and transferring the temporarily stored scheduled MBMS information to the radio link controllers under the control of the controller.

In accordance with another aspect of the present invention, there is provided an apparatus for processing packet data to transfer MBMS (Multimedia Broadcast/Multicast Service) information from a broadcast/multicast service center to radio link controllers in a CDMA (Code Division Multiple Access) mobile communication system including Node-Bs for providing MBMS to respective cells within a service area, the radio link controllers corresponding to the Node-Bs, and a media access controller for transferring the MBMS information from the radio link controllers to corresponding Node-Bs, the apparatus comprising: an MBMC-SAP (Multimedia Broadcast/Multicast Control-Service Access Point) for receiving the MBMS information from the broadcast/multicast service center, classifying the MBMS information on the basis of an MBMS area and type, and selectively outputting the MBMS information; a common MBMC layer commonly connected to the radio link controllers for processing the MBMS information from the MBMC-SAP and transferring the MBMS information to the radio link controllers; and a plurality of individual MBMC layers connected to the radio link controllers for processing the MBMS information from the MBMC-SAP and transferring the MBMS information to one radio link controller.

In accordance with another aspect of the present invention, there is provided a method for processing packet data to transfer MBMS (Multimedia Broadcast/Multicast Service) information from a broadcast/multicast service center to radio link controllers in a CDMA (Code Division Multiple Access) mobile communication system including Node-Bs for providing the MBMS to respective cells within a service area, the radio link controllers corresponding to the Node-Bs, and a media access controller for transferring the MBMS information from the radio link controllers to corresponding Node-Bs, the method comprising the steps of: (a) storing the MBMS information from the broadcast/multicast service center; (b) scheduling the stored MBMS information; and (c) temporarily storing the scheduled MBMS information and transferring the temporarily stored scheduled MBMS information to the radio link controllers.

In accordance with yet another aspect of the present invention, there is provided a method for processing packet data to transfer MBMS (Multimedia Broadcast/Multicast Service) information from a broadcast/multicast service center to radio link controllers in a CDMA (Code Division Multiple Access) mobile communication system including Node-Bs for providing the MBMS to respective cells within a service area, the radio link controllers corresponding to the Node-Bs, and a media access controller for transferring the MBMS information from the radio link controllers to corresponding Node-Bs, the method comprising the steps of: (a) receiving the MBMS information from the broadcast/multicast service center, classifying the MBMS information on the basis of an MBMS area and type, and selectively outputting the MBMS information; (b) processing the MBMS information contained at the step (a) and transferring the MBMS information to the radio link controllers; and (c) processing the MBMS information contained at the step (a) and transferring the MBMS information to one radio link controller.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. Further, a preferred embodiment of the present invention is disclosed in the following detailed description of the present invention such that the above and other objects can be accomplished. Moreover, other embodiments of the present invention will be explained in the description associated with the configuration of the present invention.

First, the conventional technique enables broadcast/multicast service information to be independently stored, scheduled, and transmitted on a cell-by-cell basis, while the present invention enables a common MBMC (Multimedia Broadcast/Multicast Control) layer to be allocated between a plurality of cells, enables MBMC layers to be classified on the basis of types of services, and uses the classified MBMC layers. That is, MBMC layers (individual MBMC layers) do not have to store large-capacity data because a unique service or transmission rate in each of cells is based on a slow rate, and the individual MBMC layers corresponding to respective cells process services requiring complex scheduling in accordance with the present invention. Moreover, the present invention enables the same information to be provided to a plurality of cells and enables a streaming-type service to be processed in an MBMC layer (common MBMC layer) commonly used in the plurality of cells.

Figure 1:
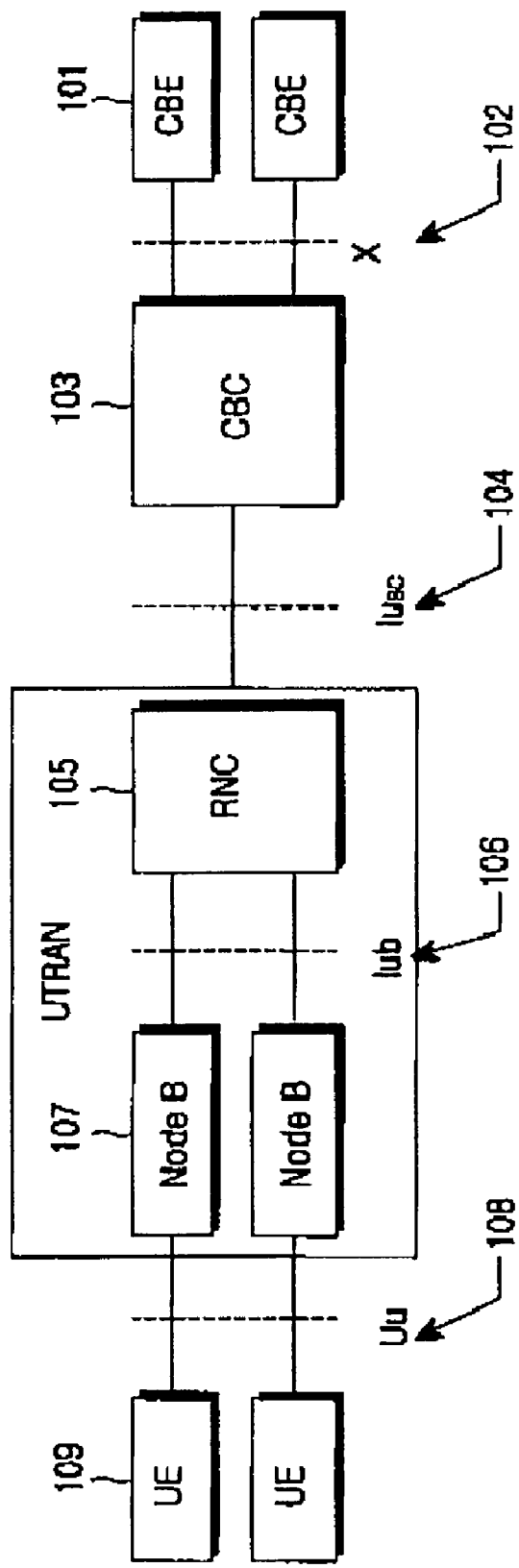
FIG. 1 illustrates a CDMA (Code Division Multiple Access) mobile communication system for providing a conventional CBS (Cell Broadcast Service)
Figure 2:
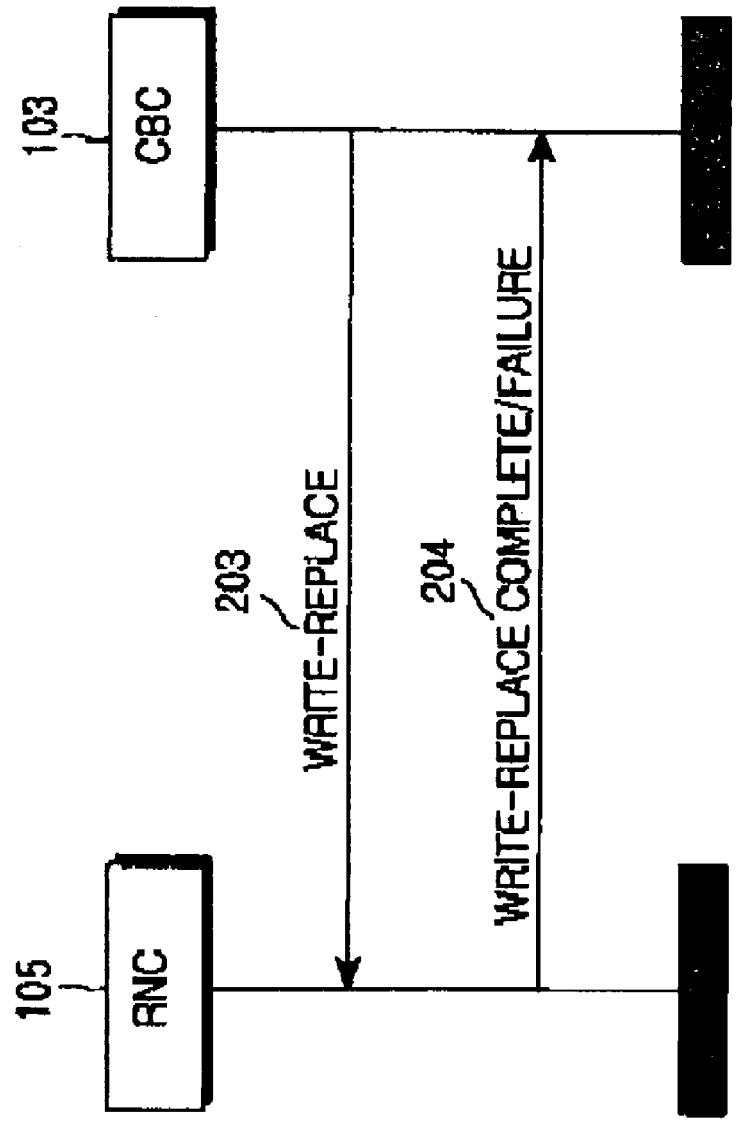
FIG. 2 is a flow chart illustrating signal processing based on a Write-Replace procedure for the conventional CBS.
Figure 3:
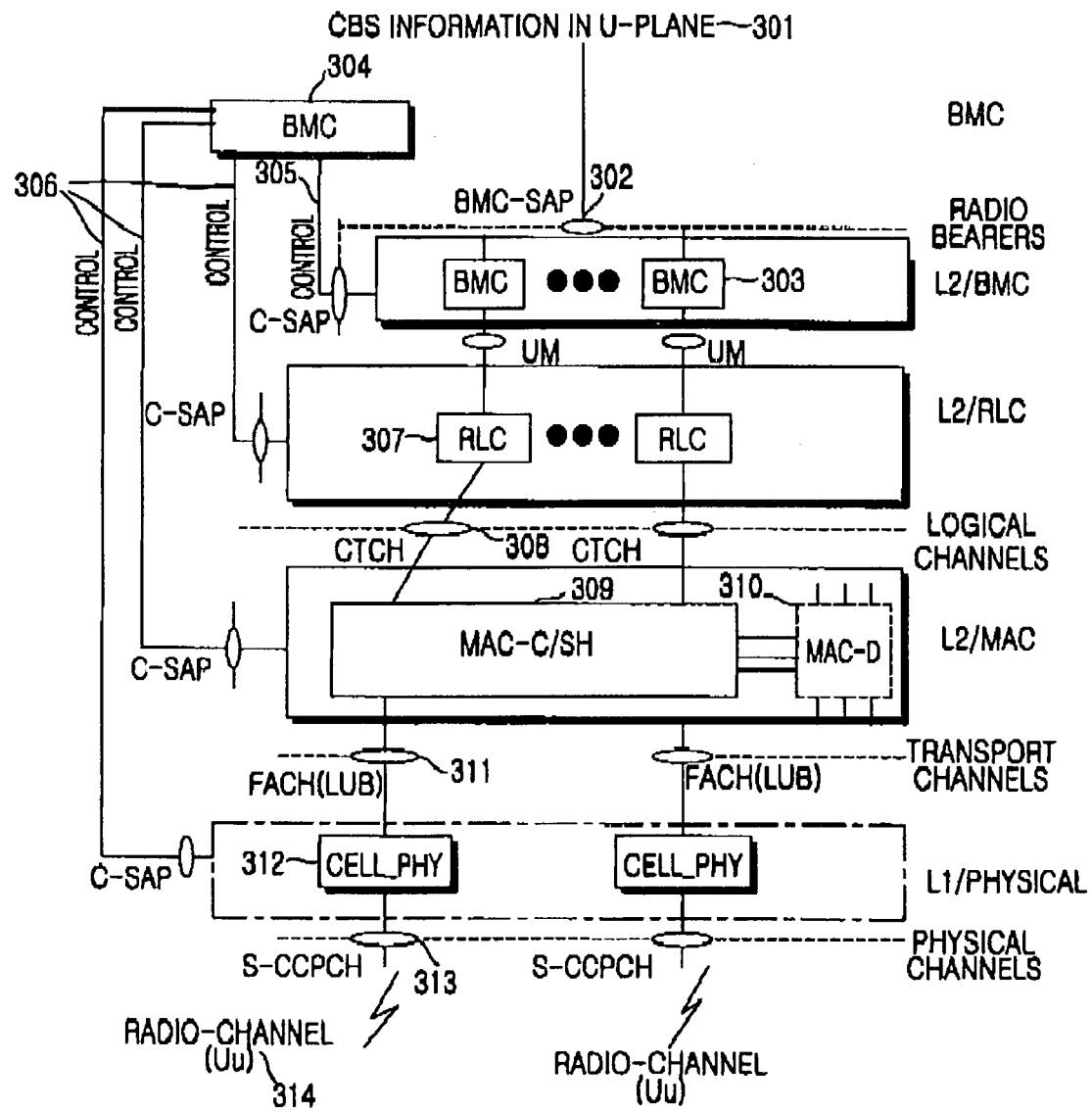
FIG. 3 illustrates communication protocol architecture of a UTRAN (UMTS (Universal Mobile Telecommunications System) Terrestrial Radio Access Network) including an RNC (Radio Network Controller) and Node-Bs illustrated in FIG. 1.
Figure 4:
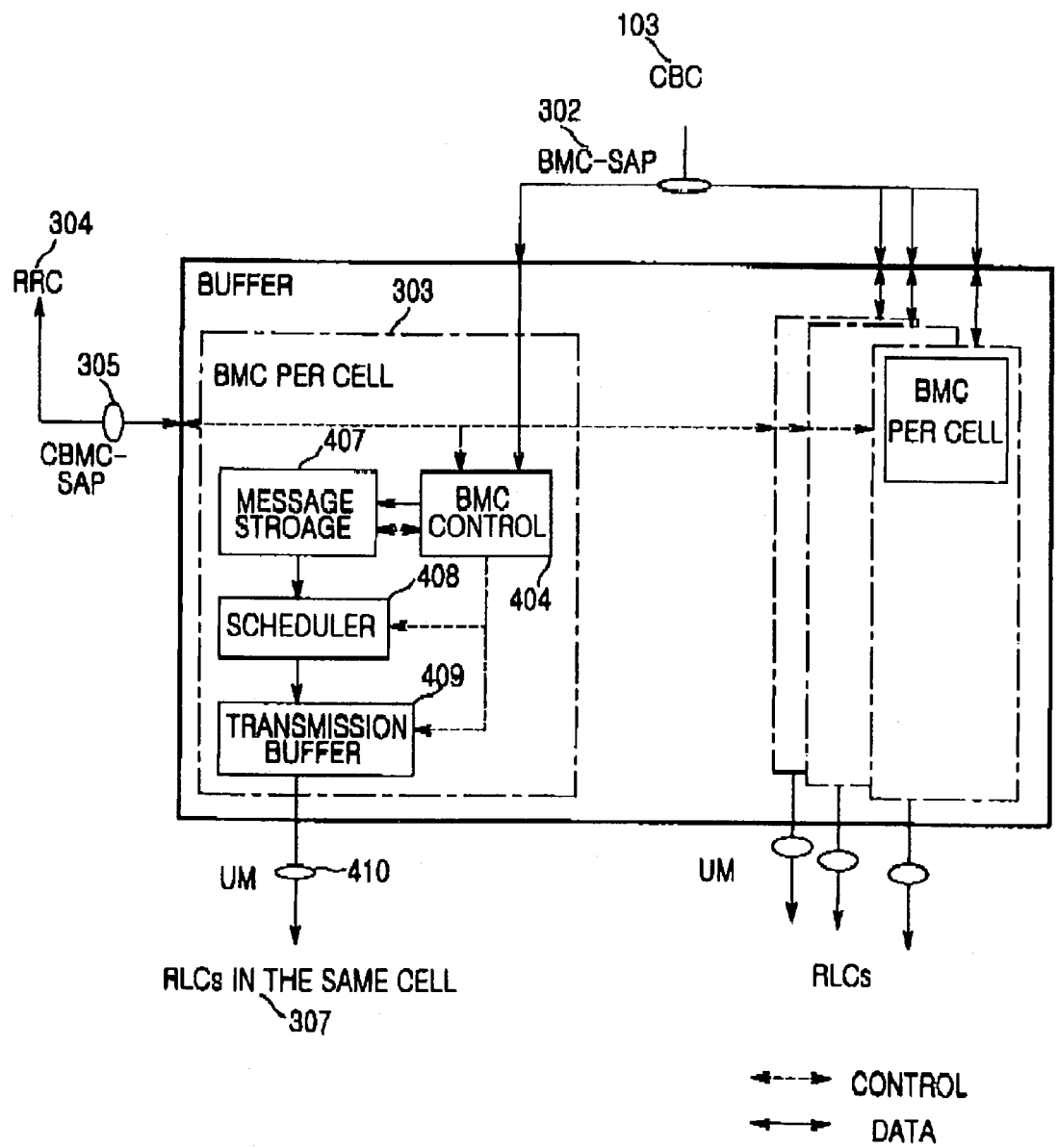
FIG. 4 illustrates a detailed configuration and functions of a BMC (Broadcast/Multicast Control) layer illustrated in FIG. 3.
Figure 5:
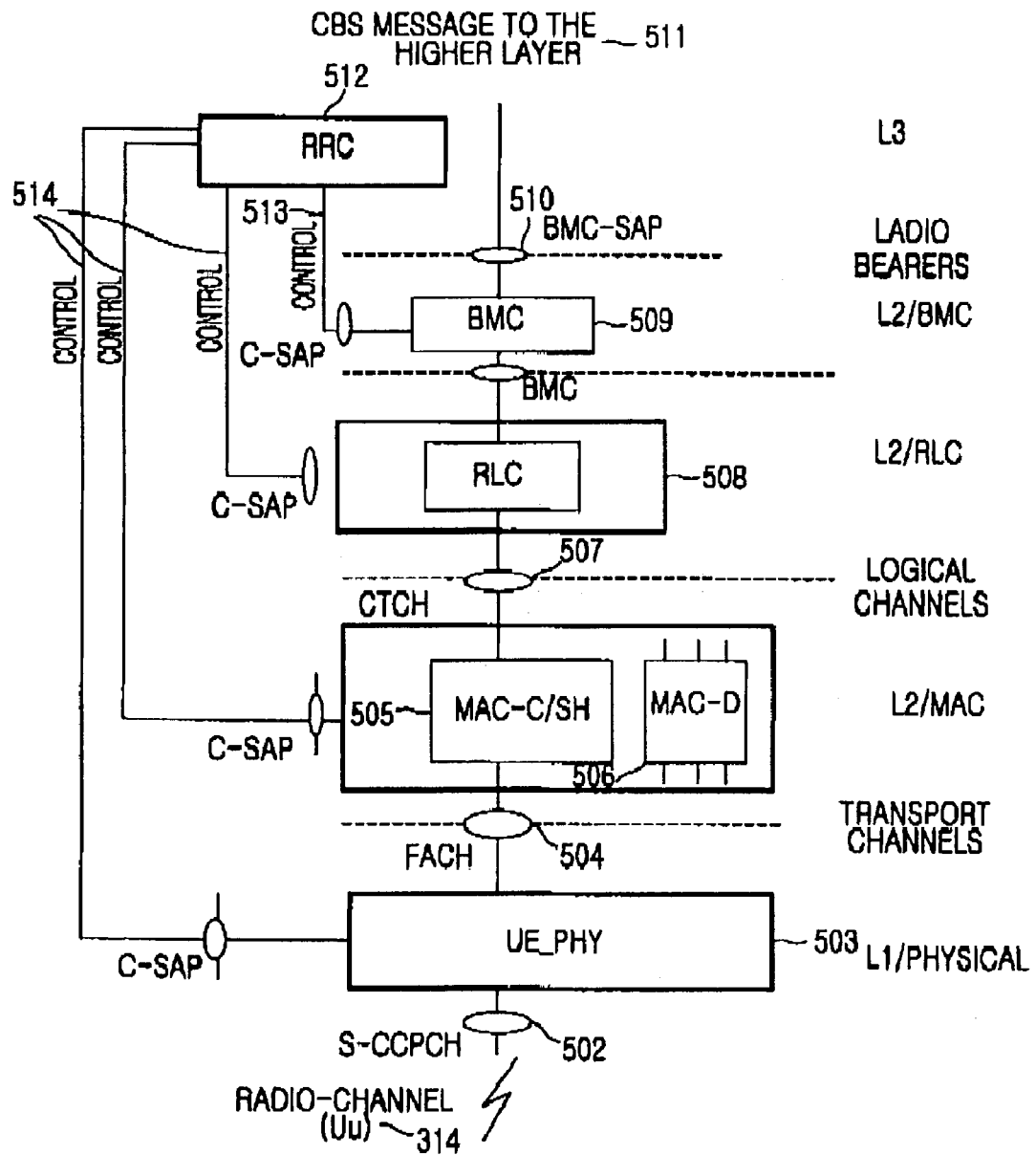
FIG. 5 illustrates communication protocol architecture of UE (User Equipment) for providing the conventional CBS corresponding to the configuration illustrated in FIG. 3.
Figure 6:
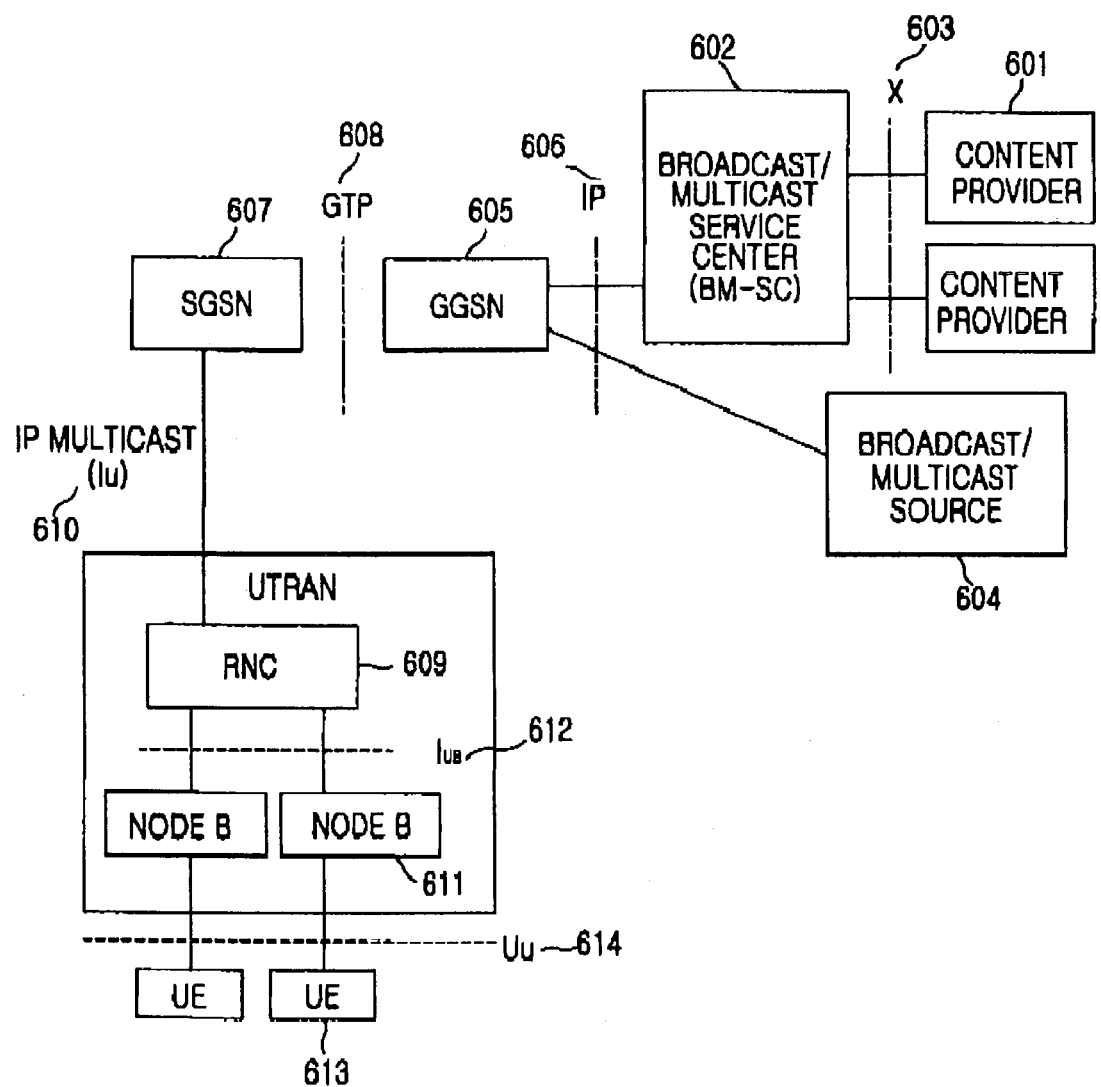
FIG. 6 illustrates a CDMA mobile communication system for providing a conventional MBMS (Multimedia Broadcast/Multicast Service)
Figure 7:
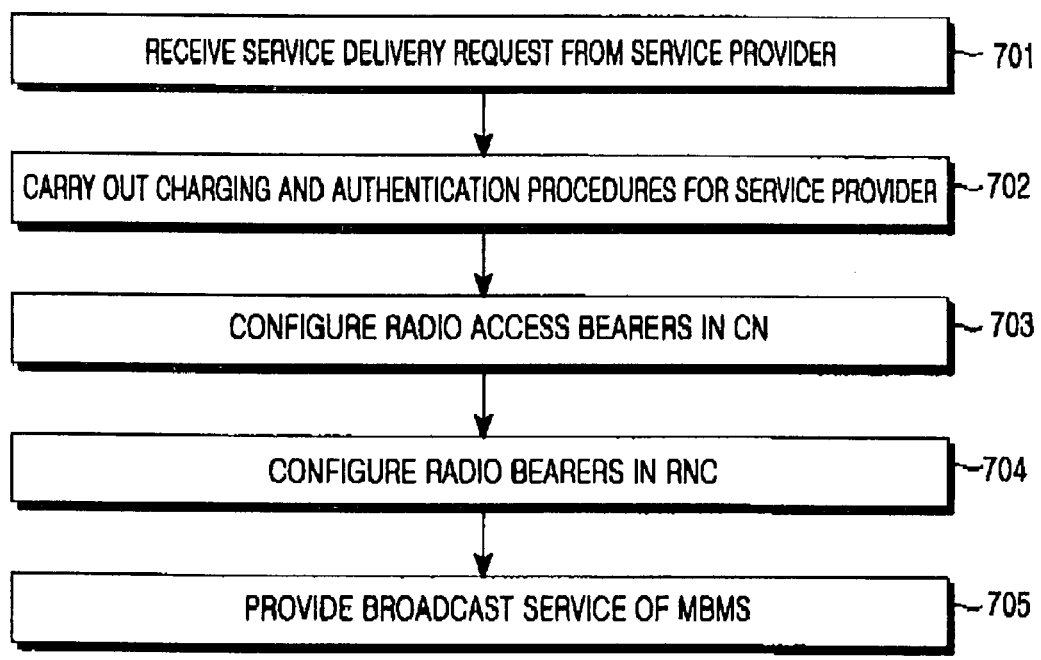
FIG. 7 is a flow chart illustrating a signal processing procedure of a mobile communication network when a broadcast service of the conventional MBMS is provided.
Figure 8:
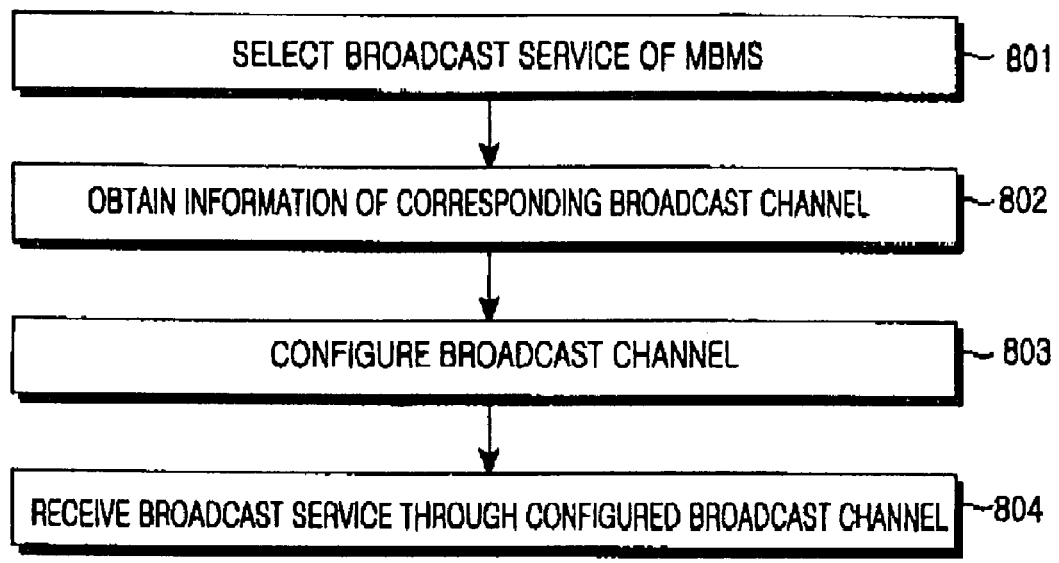
FIG. 8 is a flow chart illustrating a signal processing procedure of the UE when a broadcast service of the conventional MBMS is provided.
Figure 9:
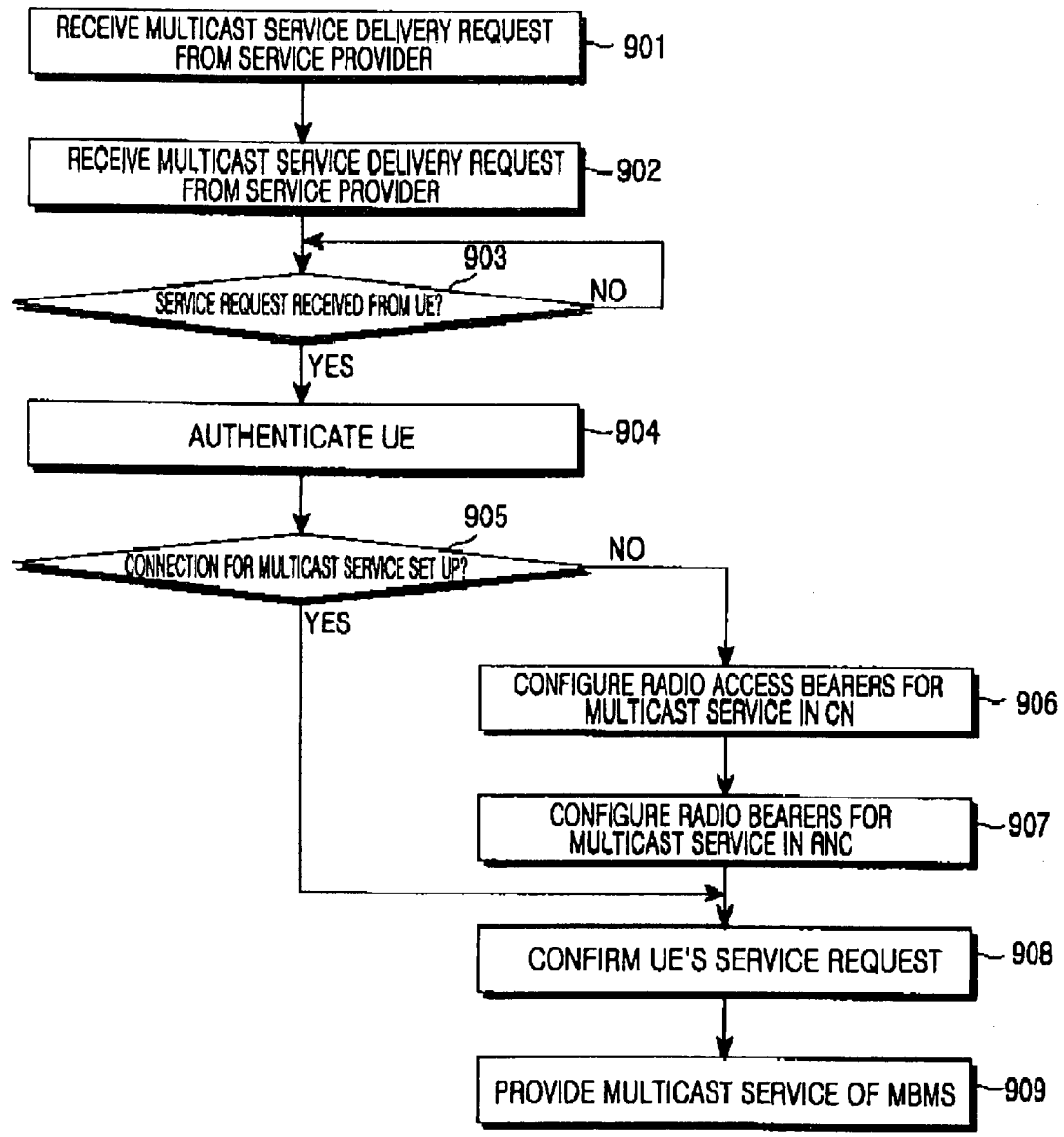
FIG. 9 is a flow chart illustrating a signal processing procedure of a mobile communication network when a multicast service of the conventional MBMS is provided.
Figure 10:
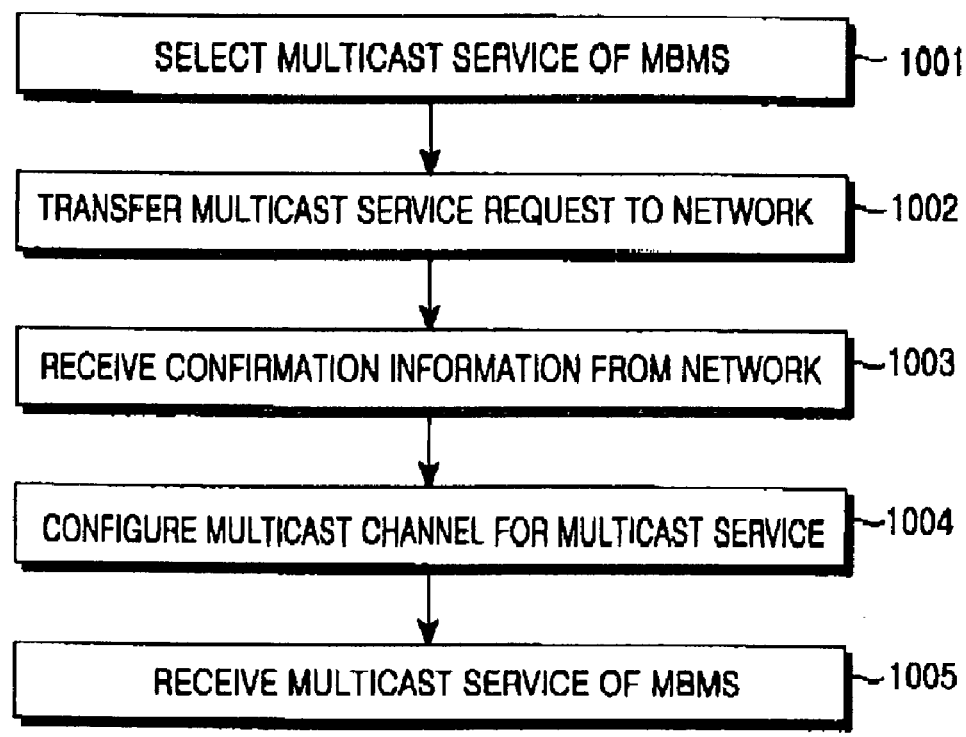
FIG. 10 is a flow chart illustrating a signal processing procedure of the UE when a multicast service of the conventional MBMS is provided.
Figure 11:
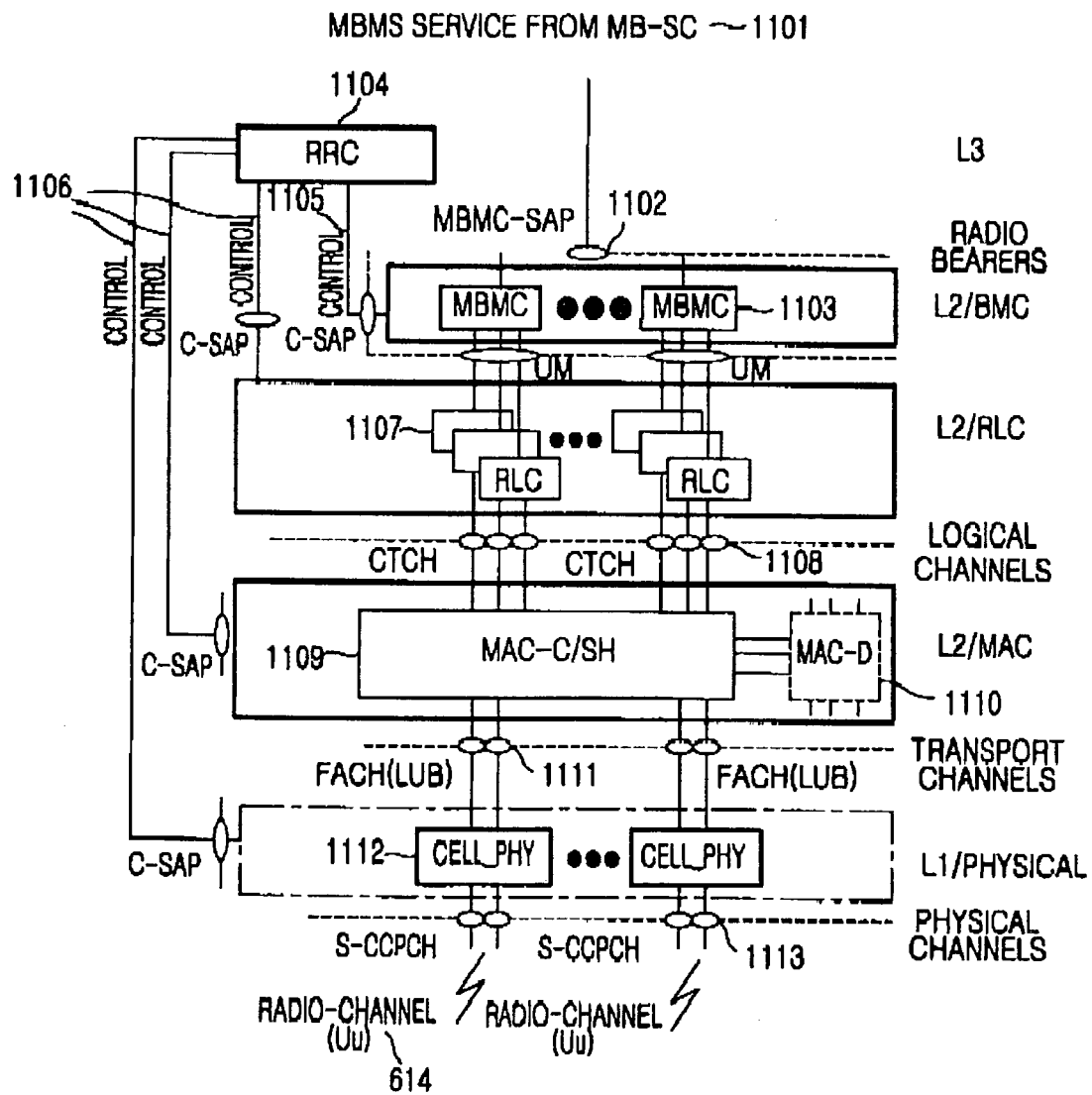
FIG. 11 illustrates communication protocol architecture of the UTRAN including an RNC and Node-Bs illustrated in FIG. 6.
Figure 12:
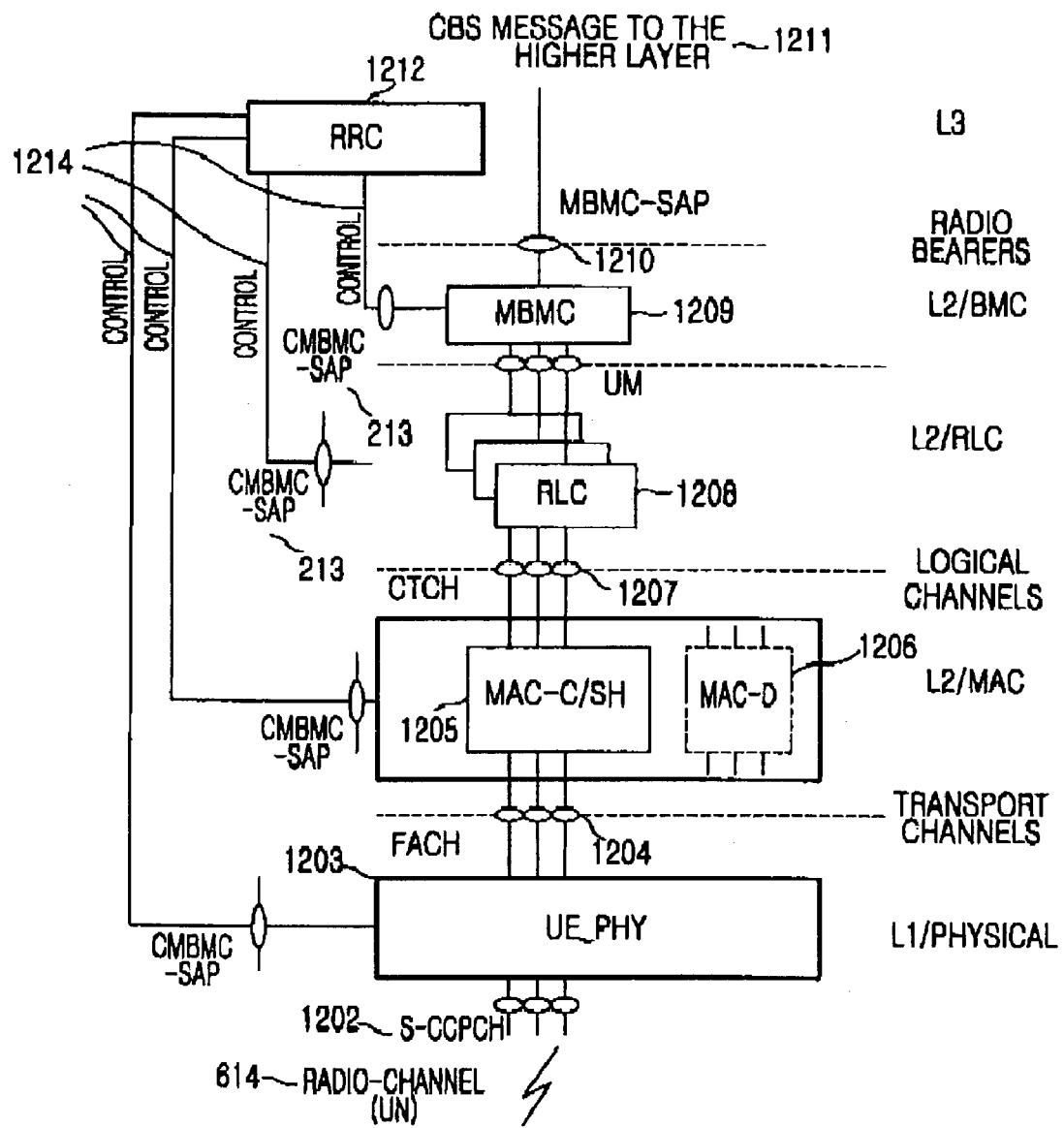
FIG. 12 illustrates communication protocol architecture of UE (User Equipment) for providing the conventional MBMS corresponding to the configuration illustrated in FIG. 11.
Figure 13:
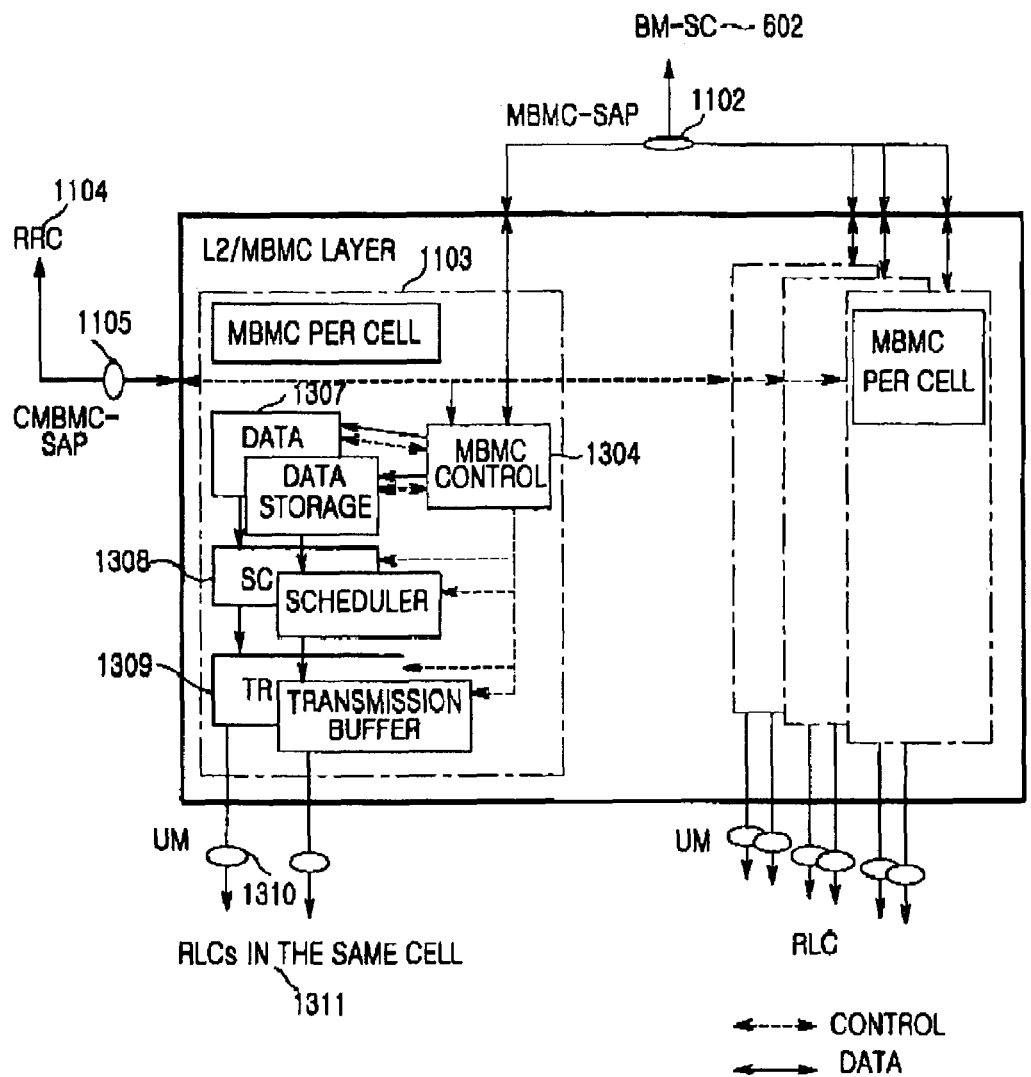
FIG. 13 illustrates a detailed configuration and functions of MBMC (Multimedia Broadcast/Multicast Control) layers illustrated in FIG. 11.
Figure 14:
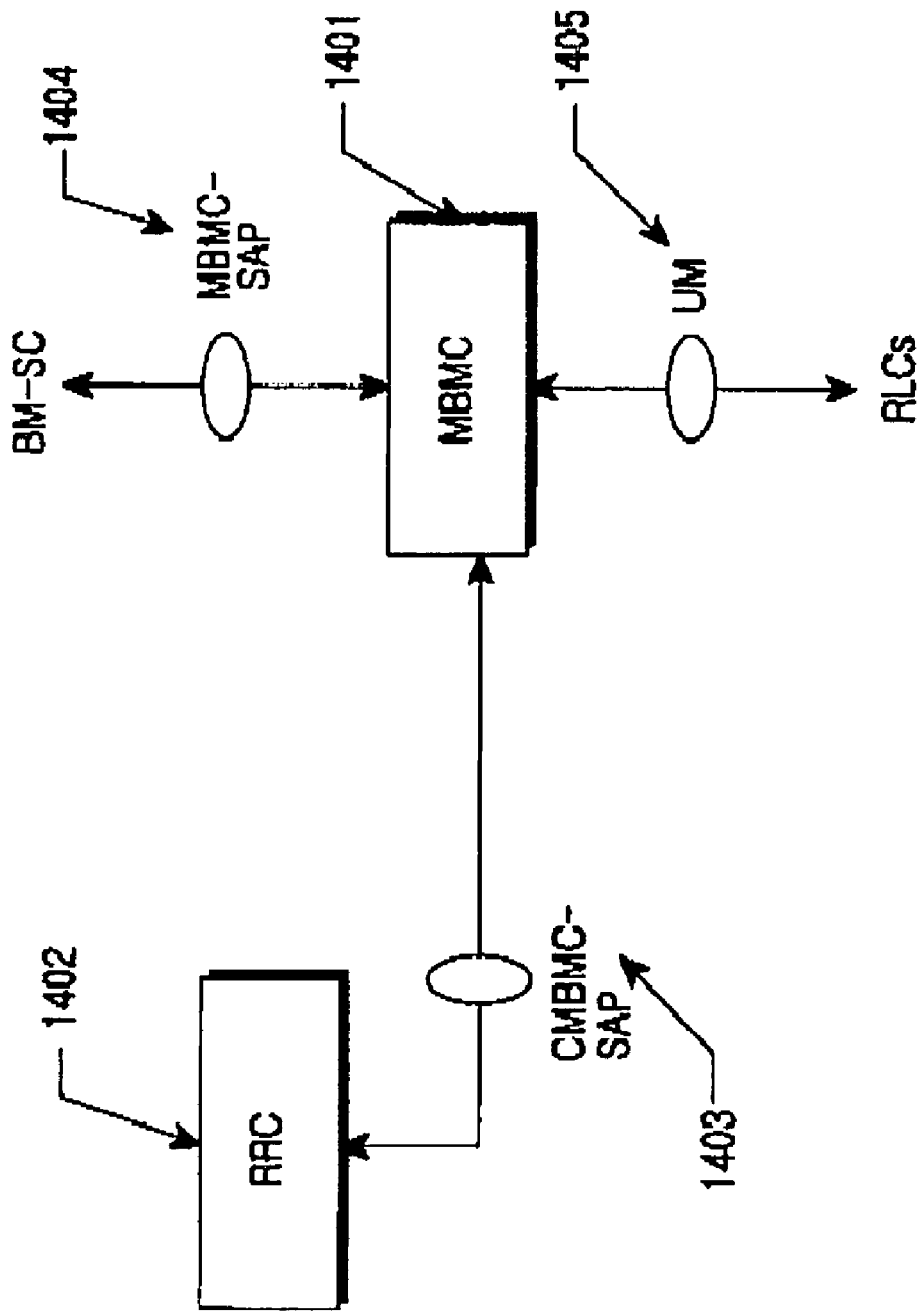
FIG. 14 illustrates a connection between a common MBMC layer and an RRC (Radio Resource Control) layer in accordance with the present invention.

FIG. 14 illustrates a connection between a common MBMC (Multimedia Broadcast/Multicast Control) layer 1401 and an RRC (Radio Resource Control) layer 1402 in accordance with the present invention. Referring to FIG. 14, the common MBMC layer 1401 provides a plurality of cells with the same MBMS (Multimedia Broadcast/Multicast Service). The common MBMC layer 1401 and the RRC layer 1402 are connected to the CMBMC-SAP (Control MBMC-Service Access Point) 1403, and the two layers 1401 and 1402 exchange control information through the CMBMC-SAP 1403. Also, the common MBMC layer 1401 is connected to an MBMC-SAP 1404, and receives MBMS information from a BM-SC (Broadcast/Multicast-Service Center) through the MBMC-SAP 1404. The common MBMC layer 1401 transfers the MBMS information to be commonly provided to the cells in a UM (Unacknowledged Mode) 1405, thereby enabling the MBMS information to be provided to RLC (Radio Link Control) layers corresponding to the cells.

Figure 15:
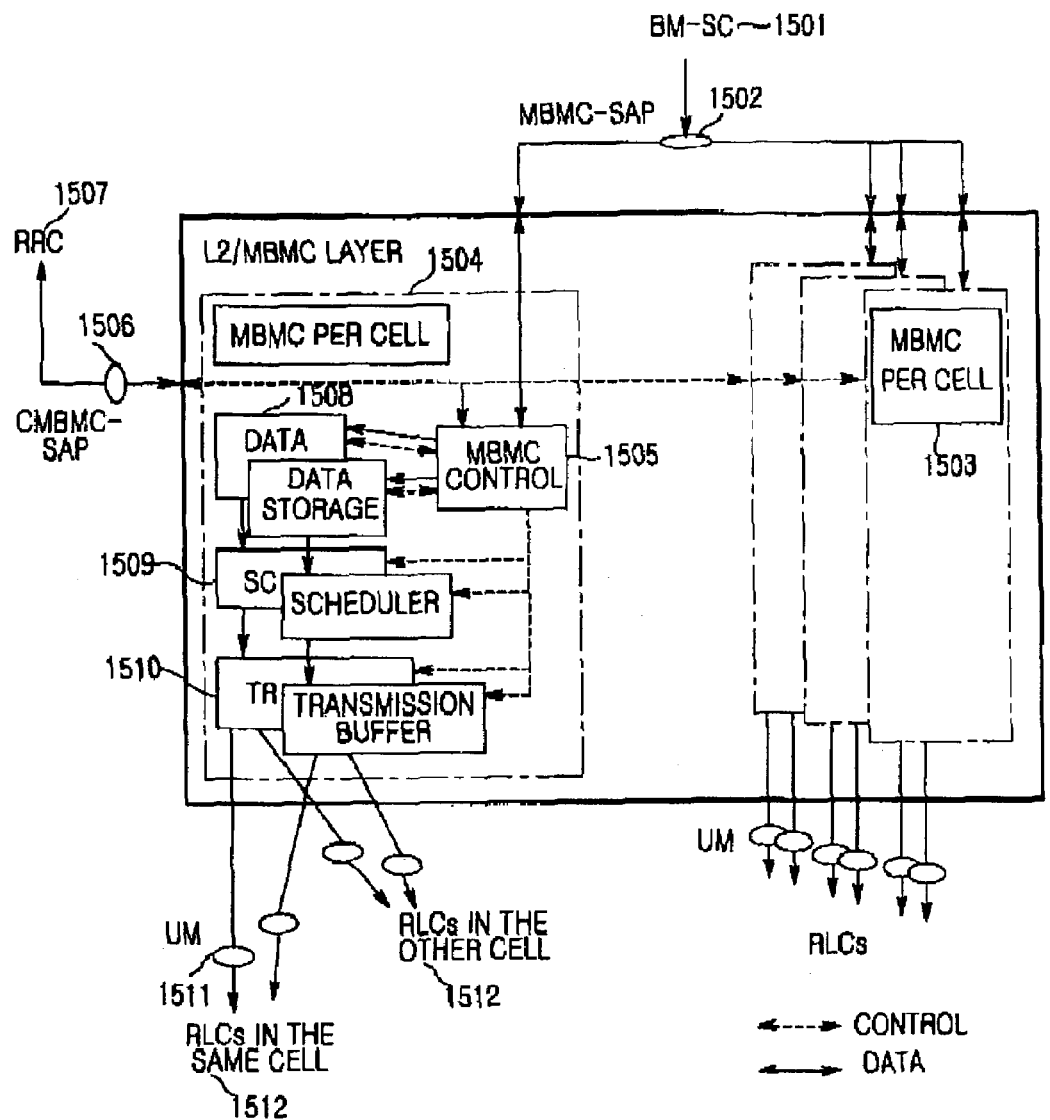
FIG. 15 illustrates a detailed configuration and functions of MBMC layers in accordance with a preferred embodiment of the present invention.

FIG. 15 illustrates a detailed configuration and functions of MBMC layers included in a UTRAN (UMTS (Universal Mobile Telecommunications System) Terrestrial Radio Access Network) in accordance with a preferred embodiment of the present invention. As illustrated in FIG. 15, the MBMC layers are classified into a common MBMC layer 1504 and individual MBMC layers 1503 on the basis of service types.

Referring to FIG. 15, MBMS information from a BM-SC 1501 is input into an MBMC-SAP 1502. The MBMC-SAP 1502 distributes the MBMS information to the individual MBMC layers 1503 or the common MBMC layer 1504 according to a service area and service type of the MBMS information. For example, the MBMS information, corresponding to each of cells included in the service area, to be individually provided is distributed to an individual MBMC layer 1503, while the MBMS information to be shared between all cells is transmitted to the common MBMC layer 1504. The common MBMC layer 1504 is shared between the cells and processes MBMS information for a streaming-type service.

The individual MBMC layers 1503 do not have to store large-capacity data because a unique service or transmission rate in each of cells is based on a slow rate, and the individual MBMC layers corresponding to respective cells process services requiring complex scheduling. Where a specific cell needs QoS (Quality of Service) different from other cells and hence data types of the cells are different although the same streaming MBMS is provided to the cells, an individual MBMC layer corresponding to the specific cell is employed. A processing operation of the individual MBMC layer 1503 for transmitting the MBMS information to the service area on a cell basis is based on the conventional processing operation. Thus, a description of the processing operation of the individual MBMC layer 1503 is omitted herein.

However, where the MBMS information is transferred to the common MBMC layer 1504, an MBMS information processing operation is performed. That is, the MBMS information is provided to a controller 1505. The controller 1505 stores the MBMS information in a data storage 1508. Each of the data storages 1508 are based on a type of the MBMS. Further, the controller 1505 considers information associated with a transmission rate, broadcast/multicast timing and a priority of a corresponding service, from the MB-SC 1501, and determines whether radio channels must be set up or changed. If the radio channels must be set up or changed, the controller 1505 requests an RRC layer 1507 to set up or change the radio channels through a CMBMC-SAP 1506. That is, the request of the channel setup for providing the MBMS within the UTRAN is transmitted to the RRC layer 1507 through a controller of an individual MBMC layer 1503 or the controller 1505 of the common MBMC layer 1504. Alternatively, the channel setup request can be directly transferred from the BM-SC 1501 to the RRC layer 1507 through a link (not shown) for transferring control information.

In response to the request from the controller 1505, the RRC layer 1507 determines whether the radio channels can be set up or changed. If the RRC layer 1507 determines that the radio channels can be set up or changed, it configures the RLC and MAC-c/sh (Medium Access Control-common/shared) layers and Cell_PHY (Cell_PHYsical) layers of all cells. If the setup or change of the radio channels for the MBMS cannot be achieved because of insufficient radio resources, the RRC layer 1507 notifies the controller 1505 that the channel setup or change has failed, through the CMBMC-SAP 1506. The controller 1505 transmits the notification of the channel setup or change failure from the RRC layer 1507 to the BM-SC 1501. Alternatively, the RRC layer 1507 can transfer the notification to the BM-SC 1501 through the link for transferring the control information. In response to the notification, the BM-SC 1501 stops a corresponding MBMS or adjusts a transmission rate of the MBMS information such that the radio channels can be set up or changed in the UTRAN.

The controller 1505 classifies the MBMS information transferred from the higher-order BM-SC 1501 on a service basis, stores the MBMS information in the data storage 1508, and controls the operation of a scheduler by considering characteristics of a corresponding service. The controller 1505 controls the MBMS information to be transferred from the transmission buffers 1510 to lower-order RLC layers 1512 by controlling the transmission buffers 1510. The schedulers 1509 read the MBMS information from the data storages 1508 on the basis of transmission frame units and then store the MBMS information in the transmission buffers 1510. Where a plurality of services are mapped to a single logical channel, the MBMS information relating to different services is multiplexed such that the multiplexed MBMS information can be coupled to the single logical channel. Further, the controller 1505 processes the MBMS information stored in the data storages 1508 such that the information is appropriate to the quality of channels or the transmission rate on a service basis, or the controller 1505 can perform a function of deleting or repeating part of information for a visual edition.

When the controller 1505 stores the MBMS information received from the BM-SC 1501 in the data storages 1508, the MBMS information is sequentially stored in streaming data order even though the MBMS information is not received in streaming data order. That is, when sequential reception of streaming data is not ensured, the UTRAN can ensure the sequential reception of streaming data by using packet Nos. of packets on a higher layer.

The controller 1505 controls the data storage 1508 such that the data storage 1508 can transfer the stored MBMS information to a corresponding scheduler 1509. The scheduler 1509 schedules the MBMS information, and the scheduled MBMS information is temporarily stored in a corresponding transmission buffer 1510. The MBMS information temporarily stored in the transmission buffer 1510 is transferred to the RLC layers 1512 in the UM 1511. At this time, the RLC layers 1512 correspond to the cells in which the MBMS information is provided.

The scheduler 1509 schedules the MBMS information by considering frame timings of the cells when processing the MBMS information shared between the cells. The frame timings of the cells are not the same as one another. That is, a frame start time of any given cell is different from that of another cell, and the scheduler 1509 of the common MBMC layer 1504 performs the scheduling on the basis of a cell having the earliest frame start time among the cells. The MBMS information stored in the transmission buffers 1510 is transferred to the RLC layers 1512 corresponding to the cells at the frame timings on a cell basis. The transmission buffer 1510 implemented by one physical buffer can control a transmission point in time. If the MBMS information is stored in at least one common transmission buffer where the MBMC, RLC, and MAC layers are implemented on the same physical hardware, the transmission buffers are read at the frame timings on the cell basis and then the operations of the MBMC, RLC, and MAC layers are performed. Since a period of time required to perform the operations of the RLC and MAC layers is relatively shorter as compared with a time difference between frame timings, the MBMS information can be transferred to RLC and MAC layers corresponding to the cells using one physical buffer. The transmission buffers 1510 can be implemented by physically different transmission buffers on an RLC layer basis. Also, where the MBMC and RLC layers are implemented on physically different hardwares and coupled to each other by an interface, different transmission buffers can be used on an RLC layer basis such that the MBMS information can be transmitted through the interface. Further, where the MBMS information is transferred through an interface such as a data bus such that the MBMC and RLC layers can process the MBMS information, an information transfer rate to the RLC layer of each cell is limited to an interface rate between the MBMC and RLC layers. Thus, in a state in which the information has not been completely transferred to an arbitrary cell, it can begin to be transferred to another cell. At this time, different transmission buffers for the cells are used.

The individual MBMC layer 1503 transfers the MBMS information to only the RLC layer of a corresponding cell. However, the common MBMC layer 1504 transfers the MBMS information to the RLC layers 1512 corresponding to all cells coupled to an RNC (Radio Network Controller).

Figure 16:
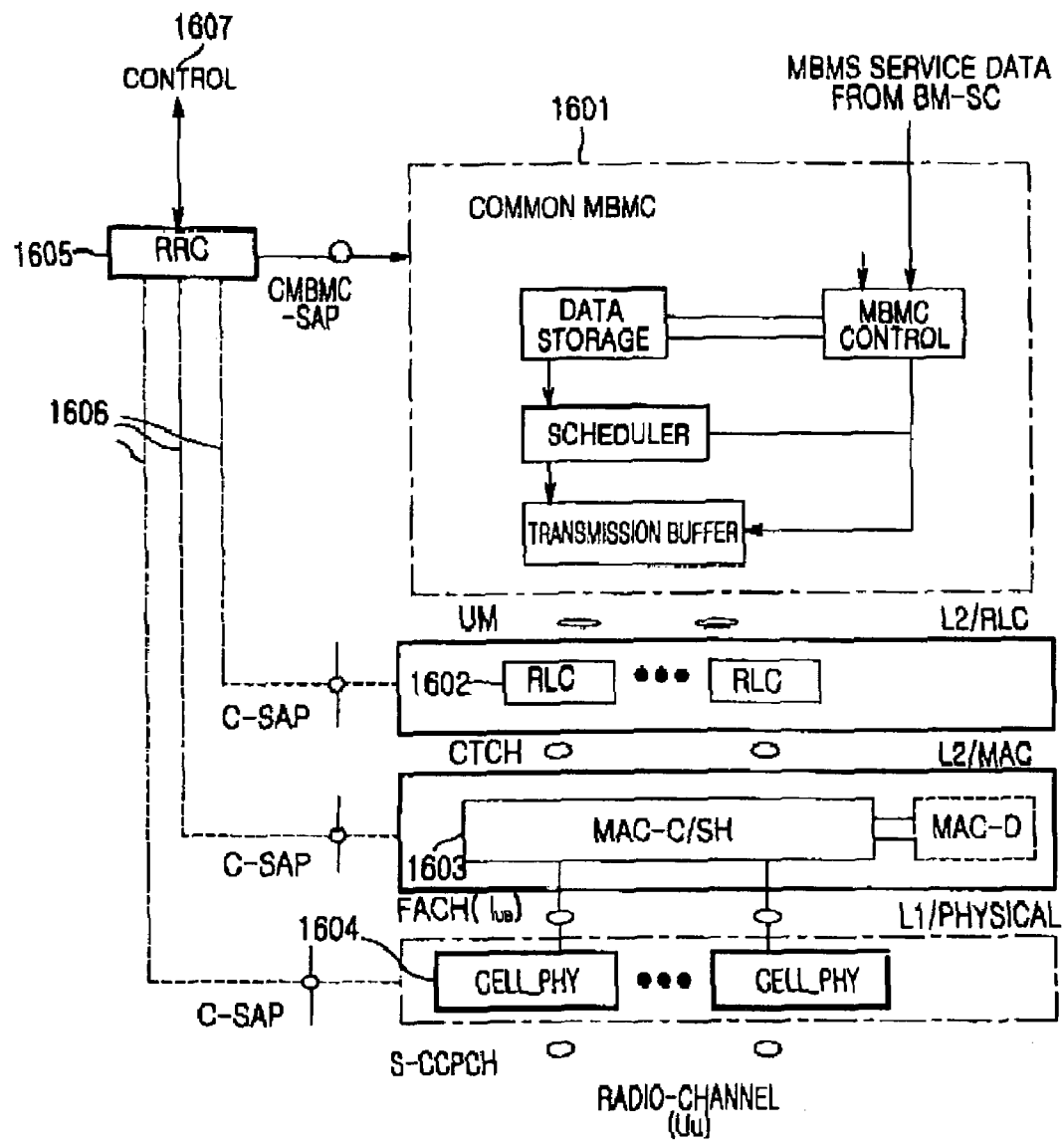
FIG. 16 illustrates communication protocol architecture of a UTRAN including an RNC and Node-Bs in accordance with an embodiment of the present invention.

FIG. 16 illustrates communication protocol architecture of a UTRAN including an RNC and Node-Bs in accordance with an embodiment of the present invention. That is, where a single common MBMC layer 1601 supports one MBMS, the architecture of the UTRAN is illustrated in FIG. 16.

Referring to FIG. 16, a transmission buffer included in the common MBMC layer 1601 is commonly coupled to RLC layers 1602 corresponding to all cells included in a service area through a UM. Thus, MBMS information from the transmission buffer is transferred to the RLC layers 1602. The RLC layers 1602 segment the MBMS information into RLC protocol data units having a predetermined size, and the RLC protocol data units are transferred to a MAC-c/sh layer 1603. The MAC-c/sh layer 1603 distributes the RLC protocol data units to Cell_PHY layers 1604 corresponding to respective cells through FACHs on Iub interfaces. At this time, the RLC protocol data units are equally distributed to all the Cell_PHY layers 1604, so that the respective cells corresponding to the Cell_PHY layers 1604 receive the same MBMS information. Also, the Cell_PHY layer 1604 of each cell transmits the MBMS information to pieces of UE located in a corresponding cell through an S-CCPCH and a Uu interface.

The RLC, MAC-c/sh, and Cell_PHY layers 1602, 1603, and 1604 are coupled to an RRC layer 1605 and C-SAPs 1606 to receive control information for the broadcast or multicast service of the MBMS from the common MBMC layer 1601. The RRC layer 1605 configures the RLC, MAC-c/sh, and Cell_PHY layers 1602, 1603, and 1604 corresponding to the cells.

There are two methods for transferring the control information between the RRC layer 1605 and a BM-SC in the above-described configurations. The first method is to transfer the control information in a user plane between the BM-SC and the common MBMC layer 1601 exchanging the MBMS information. The common MBMC layer 1601 classifies the control information and the MBMS information, and then transfers the control information to the RRC layer 1605. The second method is to configure a dedicated connection 1607 for transferring the control information between the BM-SC and the RRC layer 1605, and to enable the BM-SC and the RRC layer 1605 to exchange the control information through the dedicated connection 1607.

Figure 17:
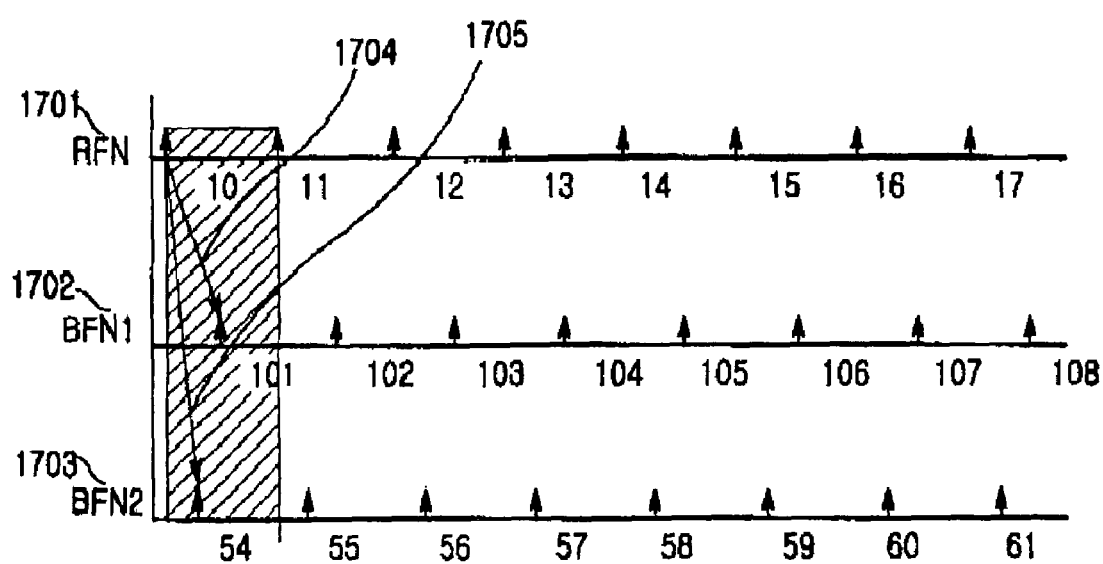
FIG. 17 is a timing diagram illustrating when MBMS information transmitted to each cell in accordance with an embodiment of the present invention.

FIG. 17 is a timing diagram illustrating the case where MBMS information transmitted to each cell in accordance with an embodiment of the present invention. That is, FIG. 17 illustrates broadcast/multicast timings when the MBMS information is transferred from a common MBMC layer to each cell.

Referring to FIG. 17, when the same broadcast information is broadcast/multicast from the common MBMC layer to pieces of UE through the RLC, MAC and physical layers corresponding to each cell, the common MBMC, RLC and MAC layers arranged in an RCN operate at the same timing according to an RFN (RNC Frame Number) 1701. Physical layers on Node-Bs operate at the timing according to a BFN (Node-B Frame Number), respectively. The cells have different timings in connection with the BFN. Thus, the MBMS information in accordance with the present invention is transferred to the cells at different times.

For example, a timing diagram for two cells is illustrated in FIG. 17. The timing of one of the two cells is represented as BFN1 1702 and the timing of the other cell is represented as BFN2 1703. As illustrated in FIG. 17, the RNC transmits data associated with an RFN 10 to the one cell at the timing corresponding to a BFN1 101 as indicated by a reference numeral 1704, and transmits the data associated with the RFN 10 to the other cell at the timing corresponding to a BFN2 54 as indicated by a reference numeral 1705. However, because the common MBMC layer provides the same data at the RFN timing, a time difference between transmission timings of the cells is limited to within one frame time. Thus, where individual MBMC layers exist for cells, transmission timings of the respective cells are individually managed, a time difference between the transmission timings has a relatively greater value and hence the time difference cannot be limited to within a constant range.

As apparent from the above description, the present invention provides the following advantages by enabling the common MBMC layer to commonly process MBMS information for a plurality of cells within an MBMS service area.

First, the present invention greatly reduces a storage overhead as compared with the conventional technique of storing high-speed data in a storage corresponding to each cell. Second, the present invention reduces an overhead of hardware and software as compared with the conventional technique of independently scheduling and controlling data on a cell basis. Third, the present invention minimizes a time difference between broadcast/multicast timings of different cells as compared with the conventional technique of individually transmitting MBMS information on the cell basis.

Although the preferred embodiments of the present invention have been disclosed for illustrative purposes, those skilled in the art will appreciate that various modifications, additions and substitutions are possible, without departing from the scope of the invention. Accordingly, the present invention is not limited to the above-described embodiments, but the present invention is defined by the claims that follow, along with their full scope of equivalents.

What is claimed is:

1. An apparatus for transmitting packet data to transfer a plurality of common service data from a service center to a plurality of cells in a CDMA (Code Division Multiple Access) mobile communication system including the plurality of cells, which represent service areas, and the service center for storing the common service data shared between at least two cells, the apparatus comprising:

a controller for performing a control operation to simultaneously transfer the common service data from the service center to radio link controllers corresponding to the at least two cells;

a data storage for storing the common service data on a basis of a service type without repeatedly storing at each cell, under the control of the controller;

a scheduler for considering frame timings associated with the at least two cells to which the common service data from the data storage is transferred on the basis of the service type under the control of the controller and scheduling the common service data; and a transmission buffer for temporarily storing the scheduled common service data and transferring the temporarily stored scheduled common service data to the radio link controllers under the control of the controller;

wherein the common service data is processed in a common MBMC (Multimedia Broadcast Multicast Control) layer commonly used in the at least two cells.

2. The apparatus as set forth in claim 1, wherein the common service data includes packet data for a streaming-type service.

3. The apparatus as set forth in claim 1, wherein the controller considers information associated with a transmission rate of the service data, broadcast and multicast timing, and a priority, provided from the service center, and requests a radio resource controller to prepare radio channels for a common service.

4. The apparatus as set forth in claim 3, wherein the radio resource controller determines whether the radio channels can be set up or changed in response to the radio channel setup or change request from the controller, and reports a result of the determination to the controller.

5. The apparatus as set forth in claim 1, further comprising a radio resource controller for considering information associated with a transmission rate of the service data, broadcast and multicast timing, and a priority, provided from the service center, determining whether radio channels for the common service must be prepared, determining whether the radio channels prepared, and reporting a result of the determination to the service center.

6. An apparatus for processing packet data to transfer service data from a service center to radio link controllers in a CDMA (Code Division Multiple Access) mobile communication system including Node-Bs for providing a packet data service to respective cells within a service area, the radio link controllers corresponding to the cells, and a media access controller for transferring the service data from the radio link controllers to corresponding cells, the apparatus comprising:

a service access point for receiving the service data from the service center, classifying the service data into common service data and individual service data on a basis of the service area and a service type;

a common processor comprising:

a controller for performing an control operation to simultaneously transfer the common service data to the radio link controllers corresponding to the at least two cells;

a data storage for storing the common service data on the basis of the service type under the control of the controller;

a scheduler for considering frame timings associated with the at least two cells to which the common service data from the data storage is transferred on the basis of the service type without repeatedly storing at each cell, under the control of the controller and scheduling the common service data; and a transmission buffer for temporarily storing the scheduled common service data and transferring the temporarily stored scheduled common service data to the radio link controllers under the control of the controller; and a plurality of individual processors corresponding to the radio link controllers for transferring the individual service data from the service access point to a radio link controller corresponding to one cell requesting the individual service data;

wherein the common service data is processed in a common MBMC (Multimedia Broadcast Multicast Control) layer commonly used in the at least two cells.

7. The apparatus as set forth in claim 6, wherein the common service data includes packet data for a streaming-type service.

8. The apparatus as set forth in claim 6, wherein the controller considers information associated with a transmission rate of the service data, broadcast and multicast timing, and a priority, provided from the service center, and requests a radio resource controller to prepare radio channels for a common service.

9. The apparatus as set forth in claim 8, wherein the radio resource controller determines whether the radio channels can be set up or changed in response to the radio channel setup or change request from the controller and reports a result of the determination to the controller.

10. The apparatus as set forth in claim 6, further comprising a radio resource controller for considering information associated with a transmission rate of the service data, broadcast and multicast timing, and a priority, provided from the service center, determining whether radio channels for the common service must be prepared, determining whether the radio channels can be prepared, and transferring a result of the determination to the service center.

11. A method for processing packet data to transfer service data from a service center to radio link controllers in a CDMA (Code Division Multiple Access) mobile communication system including Node-Bs for providing a packet data service to respective cells within a service area, the radio link controllers corresponding to the cells, and a media access controller for transferring the service data from the radio link controllers to corresponding cells, the method comprising the steps of:

(a) classifying the received service data from the service center into common service data and individual service data on a basis of the service area and a service type, and outputting the common service data and the individual service data;

(b) performing a common process comprising the steps of:
storing the common service data on the basis of the service type without repeatedly storing at each cell;

scheduling the common service data to consider frame timings associated with the at least two cells to which the common service data is transferred on the basis of the service type; and simultaneously transferring the scheduled common service data to the radio link controllers corresponding to the at least two cells; and (c) performing individual processes to transfer the individual service data from the service access point to a radio link controller corresponding to one cell requesting the individual service data, the individual processes corresponding to the radio link controllers;

wherein the common service data is processed in a common MBMC (Multimedia Broadcast Multicast Control) layer commonly used in the at least two cells.

12. The method as set forth in claim 11, wherein the common service data includes packet data for a streaming-type service.

13. The method as set forth in claim 11, wherein the step (b) further comprises the steps of:

considering information associated with a transmission rate of the service data, broadcast and multicast timing, and a priority, provided from the service center, and requesting a radio resource controller to prepare radio channels for a common service; and determining in the radio resource controller whether the radio channels prepared in response to the radio channel request from the controller, and reporting a result of the determination.

14. The method as set forth in claim 11, further comprising the step of the radio resource controller considering information associated with a transmission rate of the service data, broadcast and multicast timing, and a priority, provided from the service center, determining whether radio channels for the common service must be prepared, determining whether the radio channels can be prepared, and transferring a result of the determination to the service center.

* * * * *